(12) United States Patent
Walker

(10) Patent No.: US 8,490,355 B2
(45) Date of Patent: *Jul. 23, 2013

(54) VENTILATED STRUCTURAL PANELS AND METHOD OF CONSTRUCTION WITH VENTILATED STRUCTURAL PANELS

(76) Inventor: James Walker, Franconia, NH (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/987,832

(22) Filed: Jan. 10, 2011

(65) Prior Publication Data

US 2012/0047844 A1    Mar. 1, 2012

Related U.S. Application Data

(60) Provisional application No. 61/376,333, filed on Aug. 24, 2010.

(51) Int. Cl.
| | |
|---|---|
| *E04B 1/10* | (2006.01) |
| *E04F 17/04* | (2006.01) |
| *E04C 2/52* | (2006.01) |
| *E04C 2/34* | (2006.01) |
| *B32B 21/00* | (2006.01) |
| *B32B 3/22* | (2006.01) |
| *B32B 3/12* | (2006.01) |
| *B32B 3/24* | (2006.01) |

(52) U.S. Cl.
USPC ......... 52/302.1; 52/782.1; 428/105; 428/110; 428/138; 428/188

(58) Field of Classification Search
USPC ............ 52/302.1, 302.3, 302.4, 220.1, 220.3, 52/220.4, 220.8, 782.1, 786.13, 789.1, 790.1, 52/793.11, 799.11, 799.12, 799.13; 428/105, 428/106, 110, 188, 138
See application file for complete search history.

(56) References Cited

U.S. PATENT DOCUMENTS 1,086,031 A * 2/1914 Davis .............................. 52/216
1,928,034 A * 9/1933 Schulstadt ...................... 428/49

(Continued)

FOREIGN PATENT DOCUMENTS

| JP | 11-044011 A | 2/1999 |
|---|---|---|
| JP | 2006-007694 A | 1/2006 |

(Continued)

*Primary Examiner* — Basil Katcheves
*Assistant Examiner* — Rodney Mintz
(74) *Attorney, Agent, or Firm* — Davis & Bujold, PLLC

(57) ABSTRACT

A ventilated structural panel comprising a first sheet, having edges that define a horizontal axis with a first horizontal edge and a second horizontal edge, and vertical axis with a first vertical edge and a second vertical edge, a second sheet being of substantially the same planar dimensions as the first sheet and having edges that define a horizontal axis and vertical axis, with a first horizontal edge and a second horizontal edge and a first vertical edge and a second vertical edge, the first and the second sheet being parallel in plane and matched in at least one of the vertical axis and the horizontal axis, a plurality of spacing structural elements, fixedly attaching the first sheet to the second sheet, such that the yield strength of the combined panel is greater than the combined individual yield strengths of the first and the second sheet; and the plurality of spacing structural elements being arranged such that a plurality of unobstructed pathways are created for air to move from at least one edge of the panel to at least one of an opposite and an adjacent edge of the panel, and being arranged to provide integral ventilation through the materials and between the first and the second sheet.

19 Claims, 22 Drawing Sheets

U.S. PATENT DOCUMENTS

| | | | | |
|---|---|---|---|---|
| 2,220,606 | A * | 11/1940 | Malarkey et al. | 52/578 |
| 2,706,164 | A * | 4/1955 | Hervey | 428/106 |
| 3,228,162 | A | 1/1966 | Gregoire | |
| 3,438,164 | A * | 4/1969 | Duepree | 312/111 |
| 3,496,052 | A * | 2/1970 | Odenthal | 428/73 |
| 3,538,668 | A * | 11/1970 | Anderson | 52/783.18 |
| 3,662,507 | A * | 5/1972 | Espeland | 52/270 |
| 3,797,180 | A | 3/1974 | Grange | |
| 3,807,116 | A * | 4/1974 | Flynn | 52/793.11 |
| 3,886,706 | A * | 6/1975 | Baker | 52/793.11 |
| 3,972,164 | A | 8/1976 | Grange | |
| 4,012,882 | A * | 3/1977 | Juriss et al. | 52/793.11 |
| 4,064,300 | A * | 12/1977 | Bhangu | 428/120 |
| 4,093,762 | A * | 6/1978 | Kiefer | 428/55 |
| 4,285,181 | A * | 8/1981 | Van Loghem et al. | 52/405.4 |
| 4,329,827 | A * | 5/1982 | Thorn | 52/790.1 |
| 4,348,442 | A * | 9/1982 | Figge | 428/72 |
| 4,573,304 | A * | 3/1986 | Mieyal | 52/793.11 |
| 4,635,419 | A | 1/1987 | Forrest | |
| 4,663,909 | A * | 5/1987 | Ogino et al. | 52/302.3 |
| 4,674,249 | A * | 6/1987 | Bennett, Jr. | 52/302.3 |
| 4,822,660 | A * | 4/1989 | Lipp | 428/113 |
| 4,850,166 | A * | 7/1989 | Taylor | 52/199 |
| 4,852,314 | A | 8/1989 | Moore, Jr. | |
| 4,860,506 | A * | 8/1989 | Yoshimi et al. | 52/144 |
| 4,888,927 | A * | 12/1989 | Yoshimi et al. | 52/302.3 |
| 4,894,974 | A * | 1/1990 | Mayhew et al. | 52/783.1 |
| 4,937,122 | A * | 6/1990 | Talbert | 428/68 |
| 4,977,714 | A | 12/1990 | Gregory, Jr. | |
| 5,071,688 | A * | 12/1991 | Hoffman | 428/106 |
| 5,098,762 | A | 3/1992 | Nakajima | |
| 5,099,627 | A | 3/1992 | Coulton et al. | |
| 5,157,892 | A * | 10/1992 | Ryther | 52/793.11 |
| 5,204,161 | A * | 4/1993 | Pettit et al. | 428/174 |
| 5,277,953 | A * | 1/1994 | Tsuda | 428/53 |
| 5,299,401 | A * | 4/1994 | Shelton | 52/393 |
| 5,366,787 | A * | 11/1994 | Yasui et al. | 428/174 |
| 5,369,926 | A * | 12/1994 | Borland | 52/302.1 |
| 5,377,468 | A * | 1/1995 | Repasky | 52/302.4 |
| 5,396,750 | A * | 3/1995 | Kleyn | 52/792.11 |
| 5,433,050 | A | 7/1995 | Wilson et al. | |
| 5,468,184 | A * | 11/1995 | Collier | 454/186 |
| 5,471,806 | A * | 12/1995 | Rokhlin | 52/437 |
| 5,473,847 | A | 12/1995 | Crookston | |
| 5,487,247 | A | 1/1996 | Pigg | |
| 5,487,930 | A * | 1/1996 | Lockshaw et al. | 428/53 |
| 5,493,839 | A * | 2/1996 | Sax et al. | 52/793.11 |
| 5,526,621 | A * | 6/1996 | Shelton | 52/302.1 |
| 5,527,588 | A * | 6/1996 | Camarda et al. | 428/188 |
| 5,561,953 | A | 10/1996 | Rotter | |
| 5,561,958 | A * | 10/1996 | Clement et al. | 52/407.1 |
| 5,633,053 | A * | 5/1997 | Lockshaw et al. | 428/33 |
| 5,634,315 | A * | 6/1997 | Toya | 52/741.1 |
| 5,640,812 | A * | 6/1997 | Crowley et al. | 52/90.1 |
| 5,670,220 | A * | 9/1997 | Skoien | 428/12 |
| 5,914,175 | A * | 6/1999 | Nudo et al. | 428/178 |
| 6,017,597 | A * | 1/2000 | Minakami et al. | 428/34.4 |
| 6,134,854 | A * | 10/2000 | Stanchfield | 52/480 |
| 6,171,680 | B1 * | 1/2001 | Fahmy | 428/138 |
| 6,189,270 | B1 * | 2/2001 | Jeffers et al. | 52/220.7 |
| 6,269,598 | B1 * | 8/2001 | Wintermantel | 52/220.1 |
| 6,286,289 | B1 * | 9/2001 | Powell et al. | 52/790.1 |
| 6,415,580 | B2 | 7/2002 | Ojala | |
| 6,449,915 | B1 * | 9/2002 | Park | 52/407.1 |
| 6,591,567 | B2 * | 7/2003 | Hota et al. | 52/578 |
| 6,594,964 | B2 * | 7/2003 | Charland | 52/302.1 |
| 6,668,504 | B2 * | 12/2003 | Hughart | 52/481.1 |
| 6,780,099 | B1 | 8/2004 | Harper | |
| 6,852,386 | B2 * | 2/2005 | Nadezhdin et al. | 428/138 |
| 6,887,555 | B2 * | 5/2005 | Woo et al. | 428/138 |
| 7,090,911 | B2 * | 8/2006 | Lascelles | 428/163 |
| 7,147,741 | B2 * | 12/2006 | Sing | 156/264 |
| 7,165,369 | B2 | 1/2007 | Jandl | |
| D589,171 | S * | 3/2009 | Gleeson et al. | D25/125 |
| 7,536,835 | B2 * | 5/2009 | Schluter | 52/390 |
| 7,651,751 | B2 * | 1/2010 | Hasch et al. | 428/50 |
| 7,810,296 | B1 | 10/2010 | Turku | |
| 7,922,954 | B2 * | 4/2011 | Marschke | 264/279 |
| 8,046,969 | B2 * | 11/2011 | Dagher et al. | 52/588.1 |
| 8,141,313 | B2 * | 3/2012 | Dagher et al. | 52/588.1 |
| 8,287,984 | B2 * | 10/2012 | Grall | 428/137 |
| 8,343,398 | B2 * | 1/2013 | Khatchikian | 264/46.5 |
| 8,356,450 | B2 * | 1/2013 | Larimore | 52/302.1 |
| 8,407,965 | B2 * | 4/2013 | Dorozhkin et al. | 52/790.1 |
| 2003/0161994 | A1 * | 8/2003 | Je-Suk et al. | 428/138 |
| 2003/0167714 | A1 * | 9/2003 | Jandl | 52/302.1 |
| 2004/0101649 | A1 * | 5/2004 | Thoma | 428/54 |
| 2004/0112007 | A1 | 6/2004 | Thibeau | |
| 2004/0226238 | A1 * | 11/2004 | Haapiainen | 52/302.1 |
| 2005/0066619 | A1 * | 3/2005 | McDonald | 52/782.1 |
| 2005/0204695 | A1 * | 9/2005 | Blazevic | 52/782.1 |
| 2006/0005509 | A1 * | 1/2006 | Yohnke et al. | 52/782.1 |
| 2006/0131933 | A1 * | 6/2006 | Boehm | 296/208 |
| 2006/0144013 | A1 * | 7/2006 | Rouanet et al. | 52/782.1 |
| 2006/0218869 | A1 | 10/2006 | Ellis | |
| 2006/0242920 | A1 * | 11/2006 | Griffner | 52/302.1 |
| 2006/0260265 | A1 | 11/2006 | Zatkulak | |
| 2007/0204541 | A1 | 9/2007 | Sade | |
| 2007/0209318 | A1 * | 9/2007 | McCarthy | 52/782.1 |
| 2007/0283639 | A1 | 12/2007 | Kortuem et al. | |
| 2008/0028704 | A1 | 2/2008 | Cooper et al. | |
| 2009/0038262 | A1 * | 2/2009 | Marschke | 52/793.11 |
| 2009/0090083 | A1 * | 4/2009 | Dagher et al. | 52/741.1 |
| 2009/0183450 | A1 * | 7/2009 | Lu et al. | 52/220.1 |
| 2009/0277113 | A1 * | 11/2009 | Taraba et al. | 52/302.1 |
| 2010/0147499 | A1 * | 6/2010 | Arai et al. | 165/172 |
| 2010/0178157 | A1 * | 7/2010 | Arai et al. | 415/115 |
| 2010/0186305 | A1 * | 7/2010 | Larimore | 52/1 |
| 2010/0279065 | A1 * | 11/2010 | Schroer et al. | 428/138 |
| 2010/0325990 | A1 * | 12/2010 | Taraba et al. | 52/302.1 |
| 2011/0030300 | A1 * | 2/2011 | Liu | 52/403.1 |
| 2011/0072746 | A1 * | 3/2011 | Dagher et al. | 52/302.1 |
| 2011/0162299 | A1 * | 7/2011 | Azzolini | 52/173.3 |
| 2011/0265407 | A1 * | 11/2011 | Bryson | 52/302.1 |
| 2012/0017525 | A1 * | 1/2012 | Knapp et al. | 52/173.1 |
| 2012/0047839 | A1 * | 3/2012 | Walker | 52/580 |
| 2012/0174518 | A1 * | 7/2012 | Litaize | 52/582.1 |
| 2012/0186184 | A1 * | 7/2012 | Mencio | 52/588.1 |
| 2012/0285116 | A1 * | 11/2012 | Walker | 52/741.4 |
| 2013/0036692 | A1 * | 2/2013 | Aspenson et al. | 52/302.3 |

FOREIGN PATENT DOCUMENTS

| | | |
|---|---|---|
| WO | WO 2011039439 A1 * | 4/2011 |
| WO | WO 2012027353 A2 * | 3/2012 |
| WO | WO 2012027353 A3 * | 5/2012 |

* cited by examiner

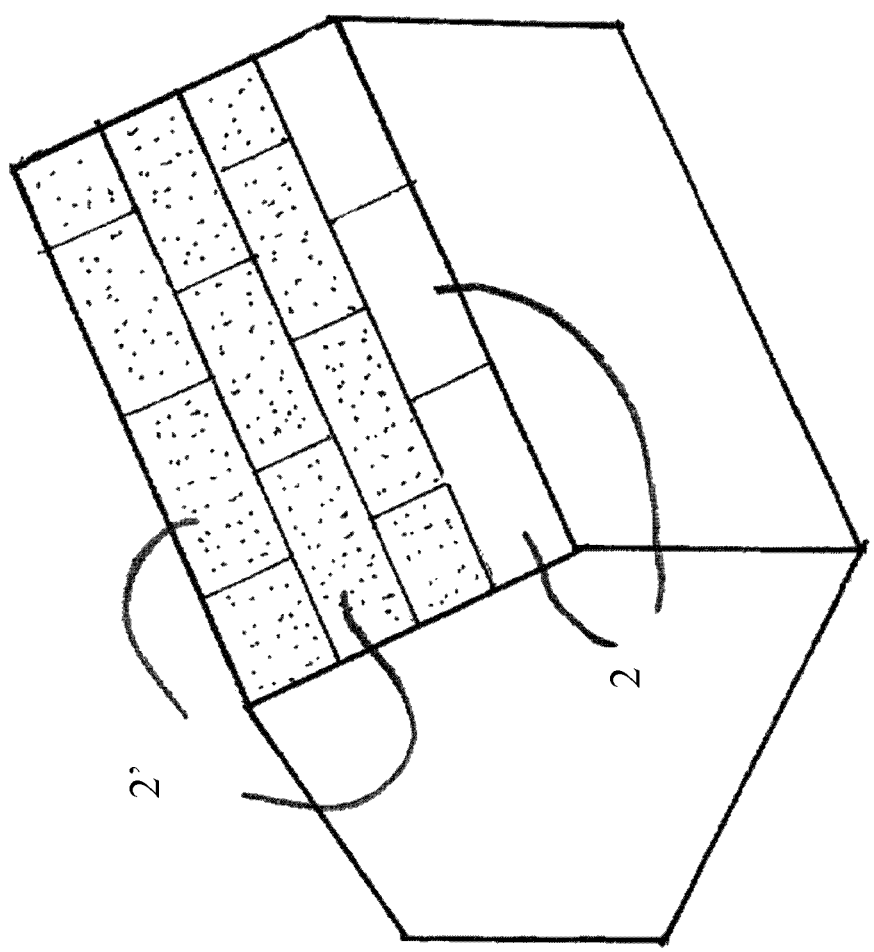

VENTILATED STRUCTURAL PANELS AND METHOD OF CONSTRUCTION WITH VENTILATED STRUCTURAL PANELS

PRIORITY

This application claims priority to Provisional Patent Application No. 61,376,333, filed Aug. 24, 2010.

FIELD OF THE INVENTION

Residential and commercial sheathing for roofs, walls, floors, and ceilings.

BACKGROUND OF THE INVENTION

Sheathing is an essential component of any residential or commercial structure and provides structural support for roofs, walls and floors, as well as providing a surface of sufficient thickness and strength for the attachment of roofing materials such as asphalt shingles and metal roofing, siding materials such as wood clapboards or vinyl siding and flooring finishes such as tile, wood, hardwood, laminates, vinyls or carpets and the like.

Sheathing has traditionally been supplied in 4'×8' sheets, made of plywood or OSB, which provide a desirable modular size that can be handled by one worker. The means of attachment depends on the function, thickness and strength requirements of the application and may include mechanical fasteners such as nails or staples and/or adhesives. Roofs, walls, and flooring use sheets of similar sizes, though varied thickness.

Complex, costly, and non-commercially feasible systems have been proposed to incorporate in some manner ventilation systems into sheathing, but they lack the structural strength and other benefits of the present invention.

SUMMARY OF THE INVENTION

Wherefore, it is an object of the present invention to overcome the above mentioned shortcomings and drawbacks associated with the prior art by providing a ventilated structural panel that allows for ventilation out of and throughout a structure, while simultaneously providing a panel of substantially increased strength, formed of readily available construction materials, for small additional cost.

Another object of the present invention is to provide a ventilated structural panel comprising a first sheet, having edges that define a horizontal axis with a first horizontal edge and a second horizontal edge, and vertical axis with a first vertical edge and a second vertical edge. The panel additionally comprises a second sheet being of substantially the same planar dimensions as the first sheet and having edges that define a horizontal axis and vertical axis, with a first horizontal edge and a second horizontal edge and a first vertical edge and a second vertical edge; the first and second sheet being parallel in plane and preferably matched in at least one of the vertical axis and the horizontal axis. A plurality of spacing structural elements fixedly attaches the first sheet to the second sheet, such that the strength of the combined panel is multiple times greater than the combined individual strength of the first and second sheet. The ventilated structural panel can be at least semi-permeable to the passage of gases and liquids and the first sheet of the panel could have one or more perforations.

The invention is an interlocking construction panel of the same size and approximate weight of conventional sheathing products that incorporates integral ventilation into the structure. The invention may be used as a conventional sheathing and is attached with the same mechanical methods of nailing and/or adhesives. It is cut and fitted in the same manner. It interlocks to provide continuity of strength.

The panel is engineered such that it provides the same or superior strength of conventional methods of providing construction strength and ventilation, with fewer materials. The materials involved in the construction of the panel are relatively inexpensive and readily available.

The panels facilitate the use of a wide variety of insulation possibilities without the need for special consideration for ventilation, since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration, as the foams can break, plug or destroy conventional foam, plastic, or cardboard ventilation products, or intrude into the seams.

The panels could be combined with a multitude of construction materials and methods in the same way conventional sheathing is used today. The panels could be used with conventional soffit and ridge vents by cutting the sheathing on the panels for access to the ventilation cavity. Drip edges would have to have an extended leg to cover the side ventilation or it could be blocked with conventional trim.

The panel may be constructed of commonly available 4'×8' sheathing of a thickness determined by structural and roof fastening requirements, but may preferably vary from ¼" to 1½" in thickness, and more preferably vary from ⅜" to 1¼" in thickness. The top and bottom sheets may also vary in thickness.

The two sheets are attached to each other via the spacing structural elements, with adhesive and/or mechanical means such as nailing, stapling, screwing or machine impressed metal connections, so as to provide for the transfer of forces.

In essence, the two sheets function as the top and bottom chords of a truss or "I" beam providing superior strength, load carrying capacity, and resistance to deflection (stiffness). As a result, rafter or stud or purloin spacing may be increased where these panels are used, which would reduce material requirements, allowing the elimination of rafters and trusses with the greater spacing.

The spacing structural elements may protrude beyond two contiguous edges of the panel, and the spacing structural elements may be chamfered to enhance interlocking with adjacent panels. The spacing structural elements would likewise be indented on the two opposite contiguous edges.

Another embodiment of the invention is a panel comprised of two sheets of the same size (i.e., same area, but perhaps different thicknesses) connected to each other with a matrix of crossed spacing structural elements such that the combined entity is one structural panel. Ideally, the panel is the same size as conventional building sheathing, generally 4'×8', but can be of any size or thickness. The sheets are connected so as to be are parallel in plane and matched in the vertical axis, one on top of the other, such that they can be used in place of traditional sheathing materials currently used in building construction such as plywood sheathing, OSB sheathing and other composite sheathing materials.

In one embodiment, the panel includes a first and a second 4'×8' sheet of plywood, Oriented Strand Board (OSB), or a composite board of wood and/or plastic, each sheet having a thickness of ¼" to ¾" depending on the application. Roofs would usually consist of the two sheets measuring ¼" to ½" in thickness, depending on strength and span requirements and shingle attachment requirements, and whether the shingles are attached by staples or nails. Wall sheathing sheet thickness would also be of ¼" to ½" thickness depending on strength requirements. The top wear layer of the flooring panel will usually have a ½" to ¾" finish layer depending on strength requirements and floor covering.

Blocks may be used as the as the spacing structural elements, spacing the sheets ideally 1½" from each other. Blocks of a preferably of square or rectangular form, but the blocks could be of any shape or size, including circular, oval, regular polygons, and irregular shapes. The spacing can vary depending on the application and ventilation requirements—more spacing not only enhances ventilation and potentially increases the strength of the assembly, but would also require closer spacing of the blocks or spacers. While panels constructed with blocks would not have the degree of added strength as panels constructed of elongated members (discussed below), panels constructed of blocks would potentially be less expensive, and provide sufficient increased strength for construction with conventional 16 or 24 inch spaced of stud, rafter, truss, or joist is used.

The blocks are generally spaced from 1 to 12 times their own width apart horizontally and vertically. The specific spacing would depend on the sheet thickness and strength requirements. Blocks were found to only increase the strength of the panel, over the combined individual strength of the separate sheets comprising the panel, by approximately one half the amount of increase as panels utilizing rectangular shaped elongated members. But, using blocks does offer additional construction possibilities over rectangular elongated members due to the increased contagious space inside a panel offered by using blocks compared to using a matrix of elongated members. The blocks can be oriented on the same axis of the sheets or arranged on an angle of preferably 45°; but other orientations, such as 30° or 60°, are possible depending on the application. The angled orientation strengthens the plywood or OSB assembly.

Another embodiment of the invention uses spacing structural elements consisting of a matrix of rectangular shaped elongated members, preferably comprised of wood members with a square cross section, arranged in layers, each layer oriented perpendicular to the next, and each layer interconnected to each adjacent layer or adjacent sheet with mechanical means and/or adhesives. The individual elongated members would ideally be of ¾"×¾", but could be larger or smaller. The individual elongated members would ideally be long enough to stretch from one edge of a sheet to another—this required length varying depending on the orientation of the elongated member.

The individual elongated members would be aligned in layers and spaced, parallel, apart from one another preferably between 1 to 18 times the thickness of the elongated member, or ¾" to 13.5 inches for elongated members with cross sections measuring ¾"×¾", and more preferably between 5 and 16 times the thickness of the elongated member, and most preferably between 10 and 14 times the thickness of the elongated member. The matrix of elongated members could consist of two layers perpendicular to each other or of multiple successive perpendicular layers. The matrix can be attached to the sheets either parallel to the sheet axis or on an angle. If an angular orientation is used, the elongated members will be ideally oriented 45° to each axis of both sheets, but other orientations such as 30° or 60° are possible depending on the application. The length of the elongated members would be of a length that they stretched from a first edge of a first sheet, to a second edge of the first sheet. Chamfered elongated members would preferably measure the "edge to edge" length of a sheet, but would be shifted in the direction of the chamfered end. This would allow for the terminal chamfered end of a given elongated member to extend into a mating indented end on an abutting panel, while simultaneously allowing room for a chamfered end on an opposing abutting panel to mate with the indented end of the given elongated member. For example, chamfered mating elongated members would measure 48 inches and 96 inches in an orientation parallel to the sheet axis, and chamfered mating elongated members with a 45° orientation would measure approximately 69 inches or 137 inches respectively at the greatest measurements.

In another embodiment, the indented end of an elongated member can have a concave face that will accept all or a portion of the chamfered end of a mating elongated member. In such an embodiment, the total length of the elongated member would preferably be extended by the length in which the chamfered end recesses within the concave portion of the indented end.

In the manufacturing of the panels, the elongated members may initially be secured to the sheets at lengths greater then required, and then be trimmed to finished length at a later point in the manufacturing process.

The spacing structural elements can also be constructed of elongated members comprised of a plurality of plywood veneers, each veneer being typically ⅛" thick. This plywood matrix would be built up by multiple layers of veneered elongated members, each veneered elongated member being ideally ½" to ¾" thick and spaced from ½" to 4" apart. The plywood matrix would consist of a first layer of similarly shaped and parallel aligned veneered elongated members, followed by one or more additional layers laid perpendicular to the first and/or immediately preceding layer, until a multilayer plywood matrix of desired thickness is assembled. The veneered elongated members would be attached with adhesives. The resulting plywood matrix can be attached to the sheets either parallel to the sheet axis or on an angle. If an angular orientation is used, the veneered elongated members will be ideally oriented 45° to each axis of both sheets, but other orientations such as 30° or 60° are possible. The length of the veneered elongated members would be similar to that of the non-veneered elongated members above depending, depending on the angle of the orientation of the members to the axis of the sheets, and whether or not the veneered elongated members were chamfered.

In all cases, including spacing blocks and elongated members, the spacing structural elements can protrude on two contiguous edges and be chamfered to enhance interlocking with adjacent panels. The spacing structural elements can be similarly matingly indented on the two opposite contiguous edges. The extension is normally less than or equal to 1 inch and ideally between ½" to ¾". Additionally, the elongation and indentation may be modified to provide for both contiguous mating of adjacent panels and a spacing gap between adjacent panels of between 0.0625 inches and 0.25 inches. For example, the elongated members length could be increased by, for example, ⅛ inch, or the indentation could be reduced by ⅛ inch, or both, such that the elongated members may mating abut, but the neighboring first and second sheets would be spaced between 0.0625 inches and 0.25 inches apart.

The panels with all attributes herein described can also be manufactured similarly to plywood except that the two exterior sheets are instead separated by a plurality of elongated members that are spaced apart and, in layers, are laid on to one another perpendicular to each other to permit the passage of air and the transfer of forces. These elongated members function as the spacing structural elements. The number of elongated members can vary as can the thickness of the elongated members, the width of the elongated members, the spacing of the elongated members and the orientation of the elongated members, for instance, some may be oriented on an or arranged in the same axis of the sheets.

In all cases where there are matrices of elongated members acting as the spacing structural elements, there may be one, two, three, or four layers of elongated members, and where veneer elongated members are used, up to twelve layers may be used. Each additional layer potentially adds cost and weight, but also potentially adds strength.

The apparatus may include three layers of elongated members, with two layers perpendicular to one another and diagonally oriented to the axis of the sheets, and one layer perpendicular to an axis of the sheets. The apparatus may include three layers of elongated members, with two layers perpendicular to one another and each perpendicular to an axis of the sheets, and one layer diagonally oriented to the axes of the sheets. The apparatus may include four layers of elongated members, with two layers perpendicular to one another and each perpendicular to an axis of the sheets, and two layers perpendicular to one another and diagonally oriented to the axes of the sheets. The apparatus may include three or four layers of elongated members, with each layer oriented perpendicular to the next, and all layers either perpendicular to an axes of the sheets, or all layers diagonally oriented to the axes of the sheets.

In one embodiment, the individual sheets for each panel are spaced equally apart from each other in parallel planes and in the same vertical axis, ideally at a distance of 1½" from each other, with a matrix of spacing structural elements or members arranged in a cross hatch pattern between the two sheets. The matrix of members would ideally consist of a first layer of elongated members, each parallel, coplanar, and spaced equally from one another, the first layer being perpendicular to a second layer of elongated members, each parallel, coplanar, and spaced equally from one another. Each elongated member would generally have a square cross section and would extend in length from one side of the panel to another. For a perpendicular arrangement to the panels, where the panels are spaced at 1½" apart, this would require members of ¾" square faces with lengths of 48" and 96", or, if chamfered, longer, depending on the length of the chamfer.

A layer of screening (e.g., fiberglass, aluminum, plastic) could be affixed between the first and the second layers of elongated members. This would aid in adhesion and/or fastening of elongated members, and would facilitate the running of wires through the interior of the panels.

The elongated members are generally spaced apart from a neighboring elongated member in the same layer from 1 to 12 times their own width, more preferably 3 to 9 times their own width, and most preferably 5 to 7 times their own width. The specific spacing would depend on the sheet thickness and strength requirements.

For roofing sheathing, the top layer would preferably be laid in the long horizontal direction, and have a length of 96 inches, with a repeat of 5⅝" for shingle attachment if using nails for shingles and the object is to nail into the elongated member. The panel faces could be stamped, painted, or otherwise visibly marked with the orientation of the underlying matrix for ease of use by the workman.

The elongated members would usually be oriented perpendicular to one another on the same axis of the sheets but other orientations are possible depending on the application. Testing indicates that the perpendicular orientation significantly strengthens the plywood or OSB assembly more than any other orientation, allowing the use of thinner exterior sheets. Tests have demonstrated that a strength increase in bending stiffness for an assembly of two ¼ inch sheets, with a perpendicular matrix of two layers of ¾"×¾" elongated members spaced 5 inches apart, has a bending strength approximately 10 times greater than a single sheet of ½" of plywood alone.

The elongated members of the matrix can consist of square members made of wood, wood composite, plastic, or similar material, arranged perpendicular or close to perpendicular for an offset matrix, and interconnected to each other with mechanical means and/or adhesives.

The individual matrix members would ideally be ¾"×¾" square, and long enough to extend beyond the panel edge. The size of the elongated members could be larger or smaller and long enough to complete the required matrix of the sheets, which depends on the orientation, and extend to or beyond one edge. Spacing would be 1 to 12 times the thickness of the elongated member or ¾" to 9 inches. The matrix of "elongated members" could consist of two layers perpendicular to each other or multiple layers. The matrix can be attached to the sheets either parallel to the sheet axis or on an angle of 45°, but other orientations are possible depending on the application. In all cases, a provision is made so that the panels interconnect structurally.

For the matrix of elongated members, the elongated members may be indented preferably between ¼" and ⅝" and more preferably between ⅜" and ½" on two contiguous sides, while the other two sides would be extended by between preferably ¼" and ⅝" and more preferably between ⅜" and ½" with an end member. Additionally, the length of the elongated members could be between ¼" and ¾" longer than the sheet on two contiguous sides to machine a tongue and groove attachment.

In all embodiments, the spacing structural elements can protrude on two contiguous edges and may be chamfered to enhance interlocking with adjacent panels. The spacing structural elements would be similarly indented on the two opposite contiguous edges. The extension would normally be no more than 1 inch and would ideally be between ½" to ¾".

Additionally, the one or both sheets can be manufactured from plastic materials. These plastic sheeted panels could be used for waterproof applications such as for roofing or basement wall applications, with one or both sheets providing a barrier to liquid water and/or water vapor. The joints would be waterproofed with an application of waterproof mastic or tape. The panels could be combined with a multitude of construction materials and methods in the same way conventional sheathing is used today.

The panels could also be manufactured with a perforated bottom sheet to facilitate ventilation into the panel matrix. The perforations would ideally be round in shape, sized ¼" to 1" in diameter, and arranged in a matrix that is ideally staggered from the adjacent holes with a spacing of 4 to 12 diameters in widths. A layer of screening (e.g., fiberglass, aluminum, plastic) could be affixed along the interior or exterior surface of the perforated sheet. The perforations allow for the exhausting of heat, gases, and moisture in attics and non-living spaces. The holes should be such that the panel can still transfer necessary tensile and compressive forces. Both solid and perforated panels can be used together in building assembly, such as a roof.

The panels can facilitate the use of a wide variety of insulation possibilities without requiring special consideration for ventilation since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration.

The panels can be used in both residential and commercial construction. The panels can be used both for on site installation and for factory built modular homes. The panels would be useful for manufactured homes and trailers.

To facilitate construction, the exterior of one or both sheets could be marked with exterior lines showing the location of the interior elongated members. The exterior facing sheet could also be of waterproof construction and made of waterproof material, such as some form of plastic, providing for the exposed layer of roofing or wall covering.

In addition to wall and roof sheathing, a flooring system of the ventilated structural panels as described would have many benefits. Increased structural strength, spanning capability and reduced deflection, all of which would result in less materials needed for supports (joists or trusses or composite joists) and better performance in terms of strength and stiffness. A properly engineered panel could be used for flooring providing a plenum for air distribution providing warmed and cooled air to be distributed within the floor. The warmed air would be a desirable characteristic in bathrooms.

A properly engineered panel could be used for flooring providing a plenum for electrical distribution where wires and data communication cables could be easily run. A properly engineered panel could be used for flooring to provide a plenum for radiant heat or forced hot air heat. In this case, one interior surface would generally receive a layer of reflecting material and the spacers would have to be mechanically connected. A properly engineered panel could be used for flooring providing a plenum for plumbing distribution where pipes, tubes and conduits of proper size could be run. Finally, a flooring system with this panel construction is naturally quieter than one sheet of sheathing, providing a nose buffer. This noise buffering benefit would also apply to walls and roofing.

This panel offers three main simultaneous advantages of ventilation, ease of use, and significantly increased strength. First, these panels offer ventilation both through the panel sheets and between the panel sheets. In this way, the panels may remove moisture and gasses passing through an interior facing sheet, and exhaust them via the continuous air channel created between the sheets by the spacing structural elements. This air channel will be approximately the width and height of the combined width and height of any contiguous surface formed by the ventilated structural panels being attached contiguous with one another. Such a large air channel can provide for dramatically increased air flow over the interior facing sheet, and thus dramatically increased ventilation between the interior and exterior—even if only passively. A particular advantage this offers is for roofing situations in colder climates to assist in avoiding ice dams.

A ventilated structural paneled roof provides for ventilation of moisture and gasses from the house, and allows a flow of cold air along the entire roof surface, in the interior of the panels, to prevent the formation of ice dams. A ventilated structural paneled roof allows for the entire roof to remain cold in the winter, preventing snow from melting and ice dams from forming. Any heat that migrates into the ventilation plenum is exhausted to the outdoors and does not melt the snow on the roof. Similarly, ventilation of a wall surface provides the same benefits noted above.

Second, the structural connection between the two sheets of material interconnected with spacing structural elements with adhesive and or mechanical means to transfer shear forces provides that the entire entity becomes a synergistic structural panel with characteristics that exceed the strength of the individual parts. The top and bottom sheets act like the flanges on a beam or truss and provide better load carrying strength, increased span capability and less deflection than the individual sheets together. Preliminary tests indicate that an assembly of two ¼ inch sheets of plywood spaced with ¾ inch blocks is 4 times stronger than just one sheet of ½ inch plywood alone, and two ¼ inch sheets of plywood spaced with a matrix of two ¾" by ¾" members can be 10 times stronger than just one sheet of ½ inch plywood alone.

This extra strength can be used advantageously to increase the load capacity or the length of the unsupported span of the panel, which reduces the required number of underlying supporting rafters, studs, joists, trusses or purloins, and thus cost of building.

The spacing structural elements material, size, arrangement, thickness, shape and orientation can vary with the application and be adapted to the specific need of the application.

The plurality spacing structural elements may be arranged such that a number of linear pathways are created. Each pathway's dimensions are limited by the dimensions and arrangements of the spacing structural elements. Utilizing blocks, the pathways may measure in height the full distance separating the first and the second sheet; the width measurement is dependent on how far apart the blocks are spaced from one another. Utilizing two layers of elongated members, the height of the pathways will measure approximately one half of the distance that separates the two sheets. Like the blocks, the width of the pathways formed with elongated members will be equal to the distance separating two neighboring elongated members in the same layer. When the two layers of elongated members are arranged perpendicular to each other, the pathways will also be orthogonal. Each pathway allows air to move along each pathway unobstructed from at least one edge of the panel to at least one opposite edge of the panel.

The spacing structural elements can protrude on two contiguous sides with chamfered edges. The extent of the protrusion could be matched by an indention of the spacing structural elements on the opposite contiguous two edges which would provide for interlocking of panels. This interlocking of panels would provide structural continuity, increasing structural integrity and minimizing discontinuous deflection and buckling.

Third, the panel offers significant advantages as to ease of use. Since the panel is assembled from readily available building materials, it is familiar to the designers, suppliers and trades in terms of size and weight. It can be cut, sized and attached in the same manner of conventional sheathing. No special tools or skills are needed. No special orientation is needed to ensure the continuity of ventilation, except that the interlocks should be maintained for increased structural integrity. Ventilation is maintained without any special considerations or the use of any special additional materials, except insect and moisture blocking at the exposed edges.

Further description will be provided with reference to the Figures below.

BRIEF DESCRIPTION OF THE DRAWINGS

FIG. 16 is an iso view of a roof arrangement constructed using perforated and non-perforated panels;

DETAILED DESCRIPTION OF THE DRAWINGS

Figure 1:
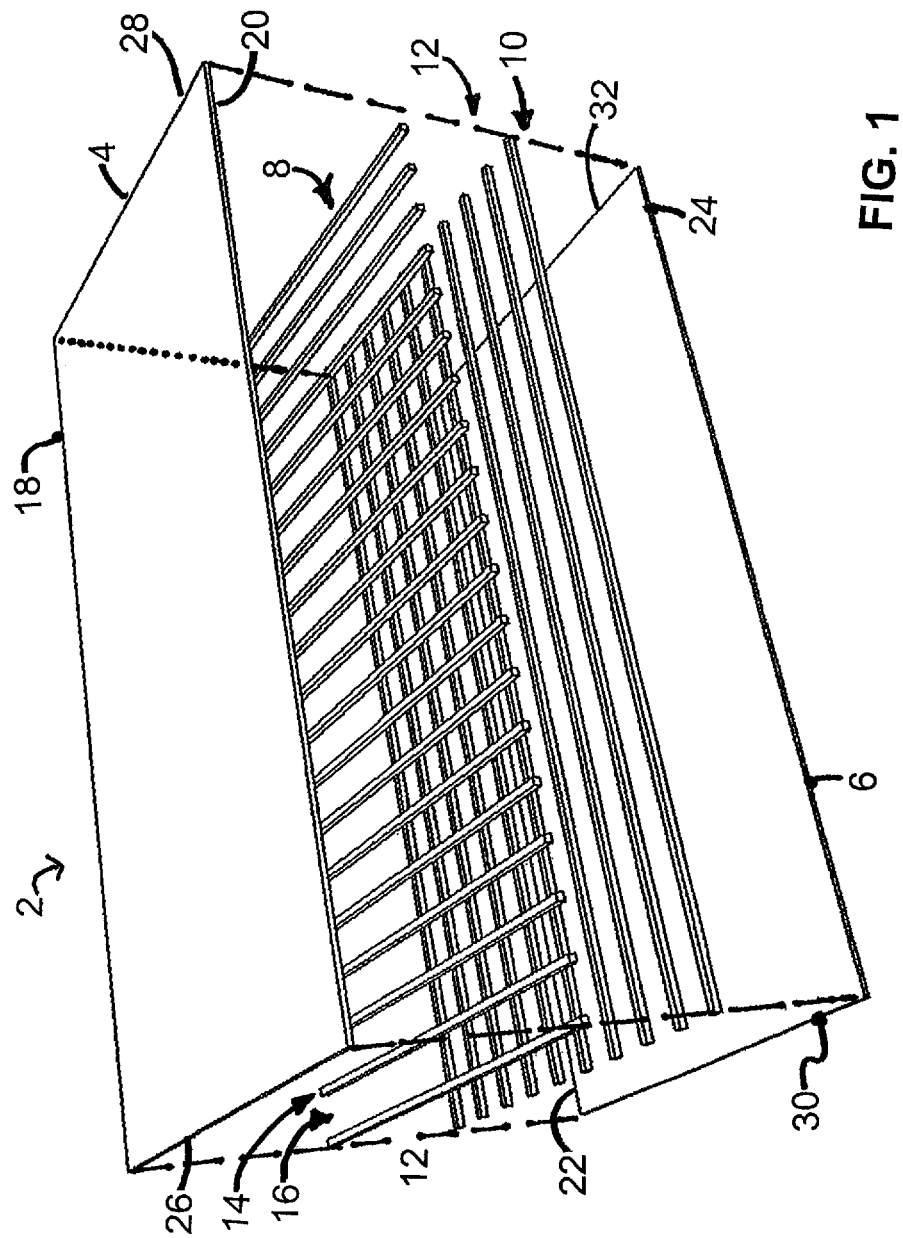
FIG. 1 is an exploded depiction of an embodiment of the panel.
Figure 2:
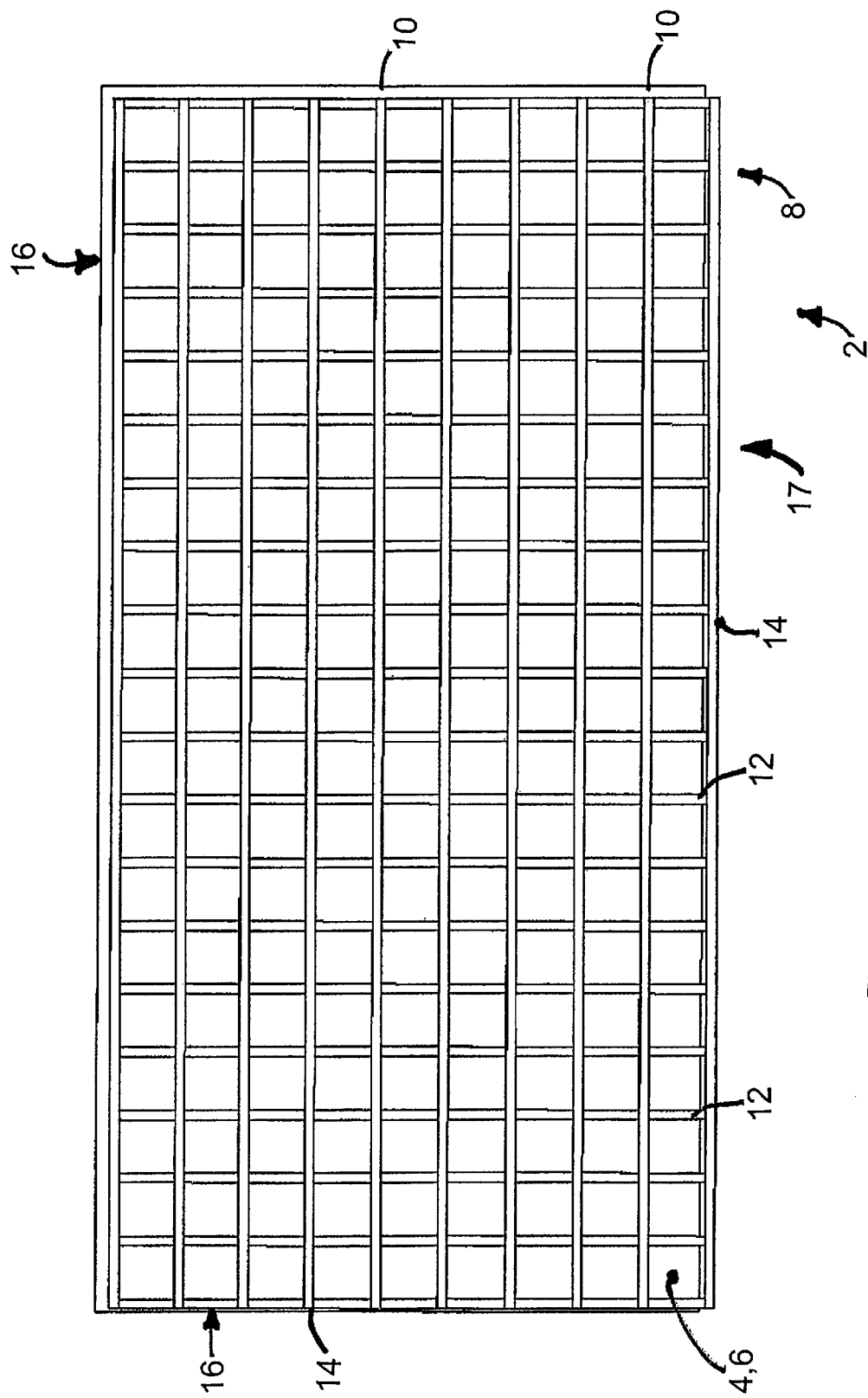
FIG. 2 is plan view of an embodiment of the panel.

As seen in FIGS. 1 and 2, the panel 2 is comprised of a first sheet 4 and a second sheet 6 fixedly mated together via spacing structural elements 8. In one embodiment the spacing structural elements 8 are comprised of a first layer 10 and a second layer 12 of rectangular shaped elongated members 14, spaced apart from each other a predetermined spacing distance 16. The arrangement of elongated members 14 in the first layer 10 is perpendicular to the arrangement of elongated members 14 in the second layer 12, forming a matrix 17 of elongated members 14.

As shown in FIG. 1, a first horizontal edge 18 and a second horizontal edge 20 of the first sheet substantially align with a first horizontal edge 22 and a second horizontal edge 24 of the second sheet 6, respectfully. Similarly, a first vertical edge 26 and a second vertical edge 28 of the first sheet substantially align with a first vertical edge 30 and a second vertical edge 32 of the second sheet 6, respectfully. For sake of clarity, the second sheet 6, though present each embodiment depicted, is not shown in FIGS. 2, 3 and 6-10 below.

Figure 3:
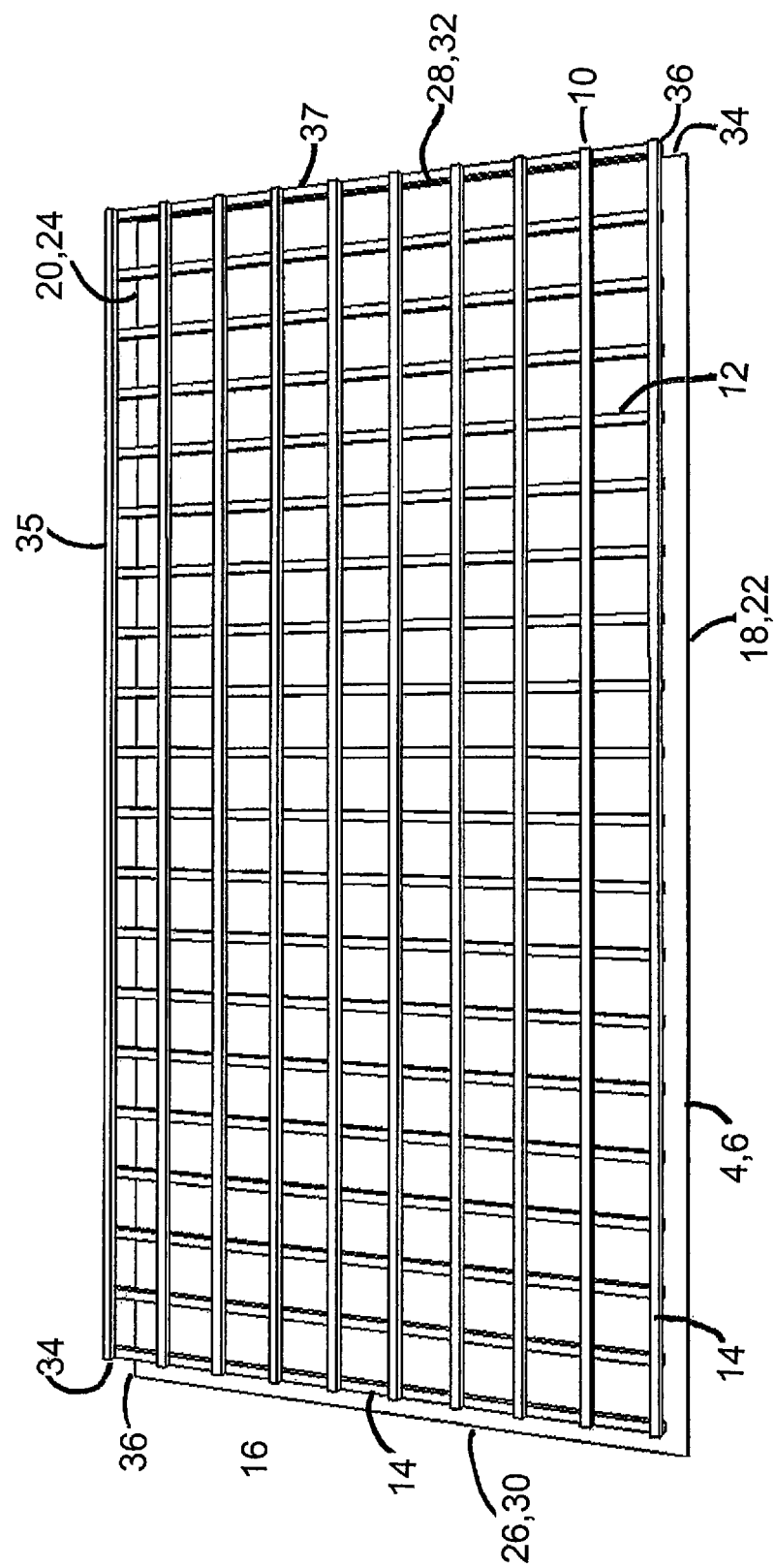
FIG. 3 is a plan view of an embodiment of the panel depicting the indented space and protruding segments.

As shown in FIG. 3, the first 10 and the second layer 12 of elongated members 14 are indented a certain first distance 34 inward from the first horizontal edges 18, 22 of the first and the second sheet 4, 6. The first 10 and the second layer 12 of elongated members 14 correspondingly overlap the second horizontal edges 20, 24 of the first and the second sheet 4, 6 by the same first distance 34, creating first protruding segments 35. Similarly, the first 10 and the second layer 12 of elongated members 14 are indented a certain second distance 36 inward from the first vertical edges 26, 30 of the first and the second sheet 4, 6. Likewise, the first 10 and the second layer 12 of elongated members 14 correspondingly overlap the second vertical edges 28, 32 of the first and the second sheet 4, 6 by the same second distance 36, creating second protruding segments 37.

These matching indents and overlaps aid in fittingly mating a first panel 2 to a neighboring second panel 2 in a secure "tongue in grove" fashion. By providing corresponding indent and overlap on all four edges, a surface formed of multiple panels may be assembled faster, have increased strength and rigidity as a unit, and helps ensure a continued smooth panel surface. As in the embodiment shown, the first distance 34 of indent and overlap with respect to the horizontal edges can be of the same value as the second distance 36 of indent and overlap in the horizontal direction. It is to be noted that the indention and overlap have been exaggerated in FIG. 3, to show detail.

Figure 4:
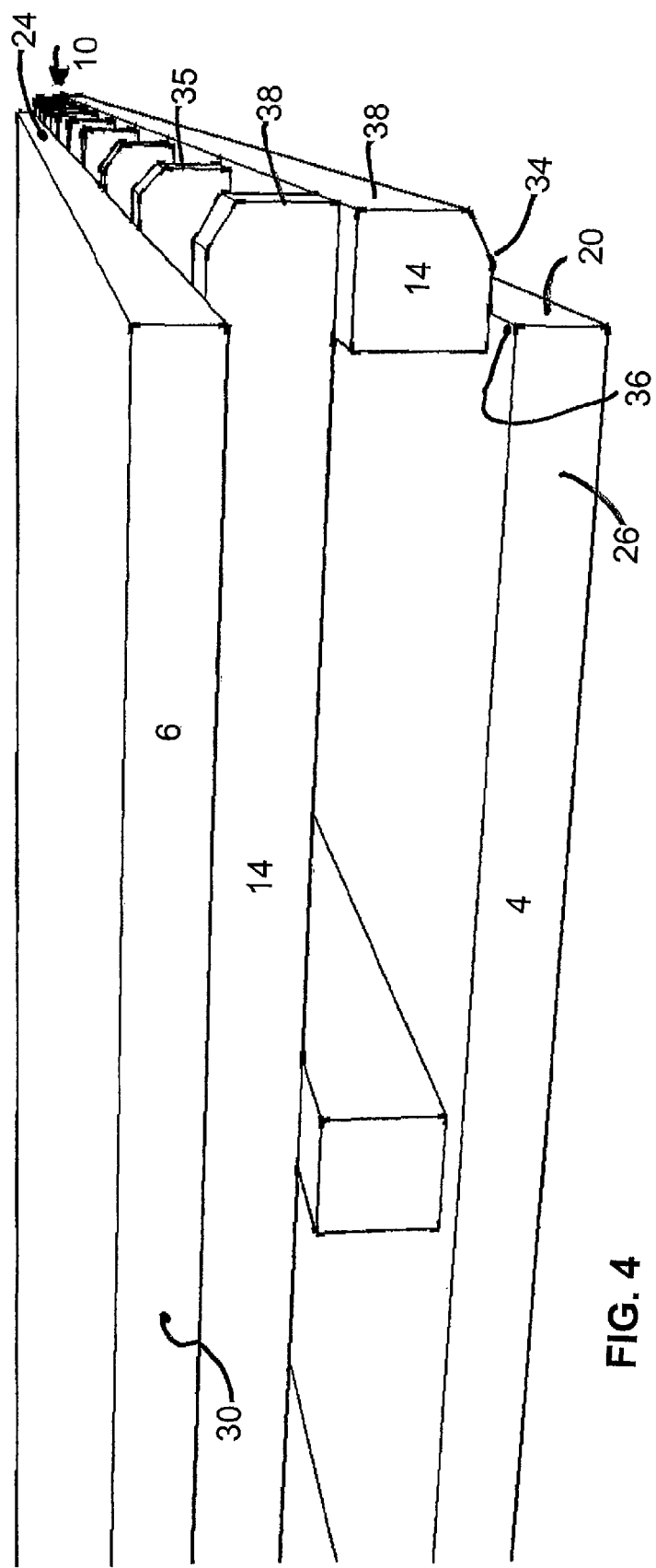
FIG. 4 is a close-up iso view of an embodiment of the panel, depicting the indented space, protruding segments, and chamfered edges.

As shown in FIG. 4, a portion of the first protruding segments 35 that overlap the second horizontal edges 20, 24 of the first and the second sheet 4, 6, have a chamfered edge 38. These chamfered edges facilitate inserting the first protruding segments 35 of the first 10 and the second layer 12 of a first panel 2 into a second adjacent panel 2, and specifically into a space provided by the inward indent of the elongated members 14 the first distance 34 from first horizontal edges 18, 22 of the first 10 and the second layer 12 of the adjacent panel. The chamfer on the chamfered edge 38 would terminate between ⅛" and ⅜" from the second horizontal edges 20, 24 of the first and the second sheet 4, 6, and preferably would terminate approximately ¼" from the second horizontal edges 20, 24 of the first and the second sheet 4, 6.

In a like manner a portion of the second protruding segments 37 that overlap the second vertical edges 28, 32 of the first and the second sheet 4, 6, have a chamfered edge 38 [not shown]. These chamfered edges similarly facilitate inserting the second protruding segments 37 of the first 10 and the second layer 12 of a first panel 2 into a second adjacent panel 2, and specifically into the space provided by the inward indent of the elongated members 14 the second distance 36 from the first vertical edges 26, 30 of the first 10 and the second layer 12 of the adjacent panel. The chamfer on the chamfered edge 38 would terminate between ⅛" and ⅜" from the second vertical edges 28, 32 of the first and the second sheet 4, 6, and preferably would terminate approximately ¼" from the second vertical edges 28, 32 of the first and the second sheet 4, 6.

Figure 5:
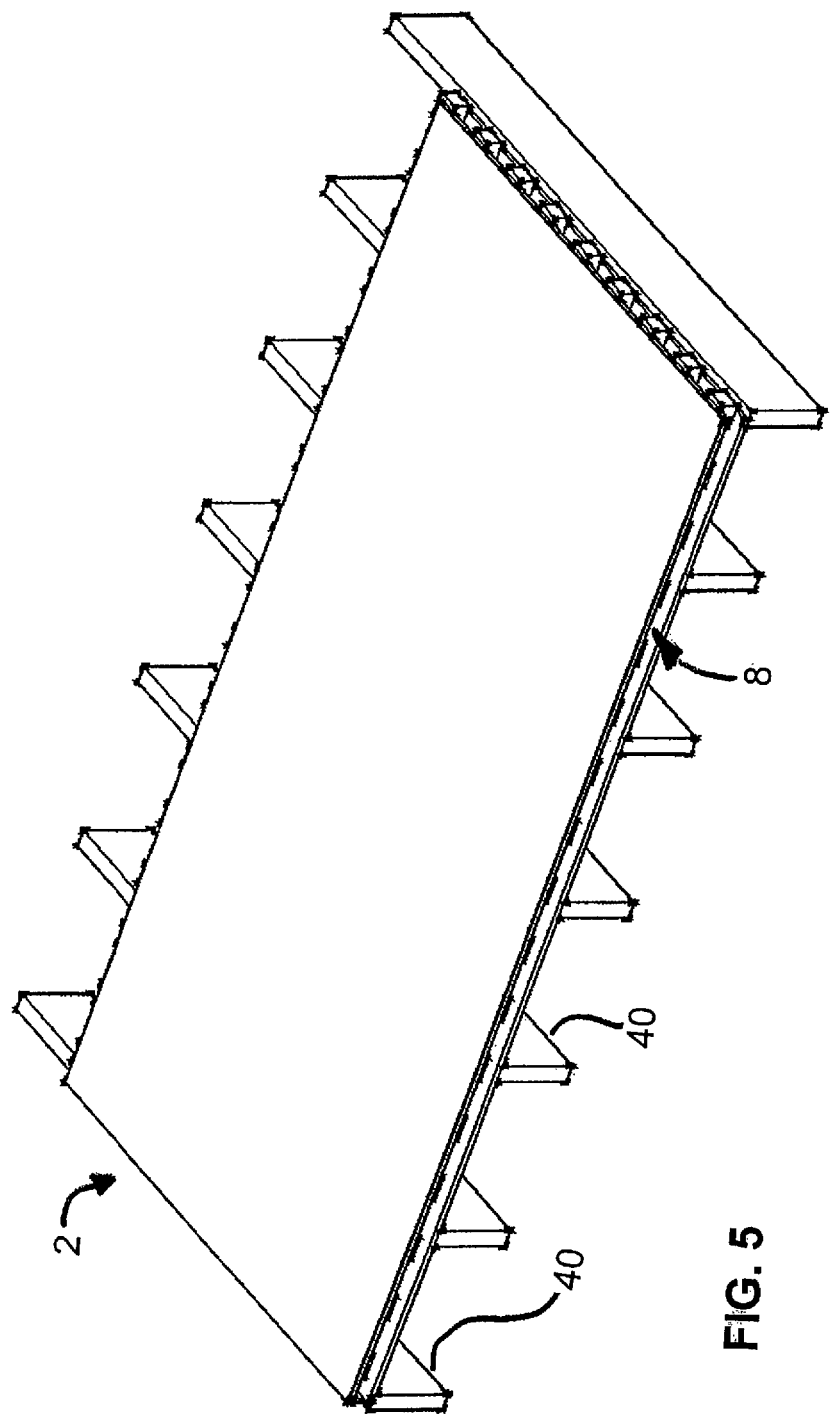
FIG. 5 is an iso view of the panel mounted on mounting elements.

As shown in FIG. 5, the panel 2 may be mounted onto mounting elements 40 such as roofing rafters or trusses, flooring joists, or wall studs, just as normal plywood or OSB board would be mounted—twelve inches on center. Because of the panels' increased strength, they may be mounted to mounting elements 40 spaced father apart than a plywood or OSB board of the same thickness as the sum of the thickness of the first and second sheet of the panel would require under similar conditions—including allowing the panels to be mounted on mounting elements 40 spaced sixteen, twenty four, thirty six, forty two, forty eight, and ninety six inches apart on center.

Figure 6:
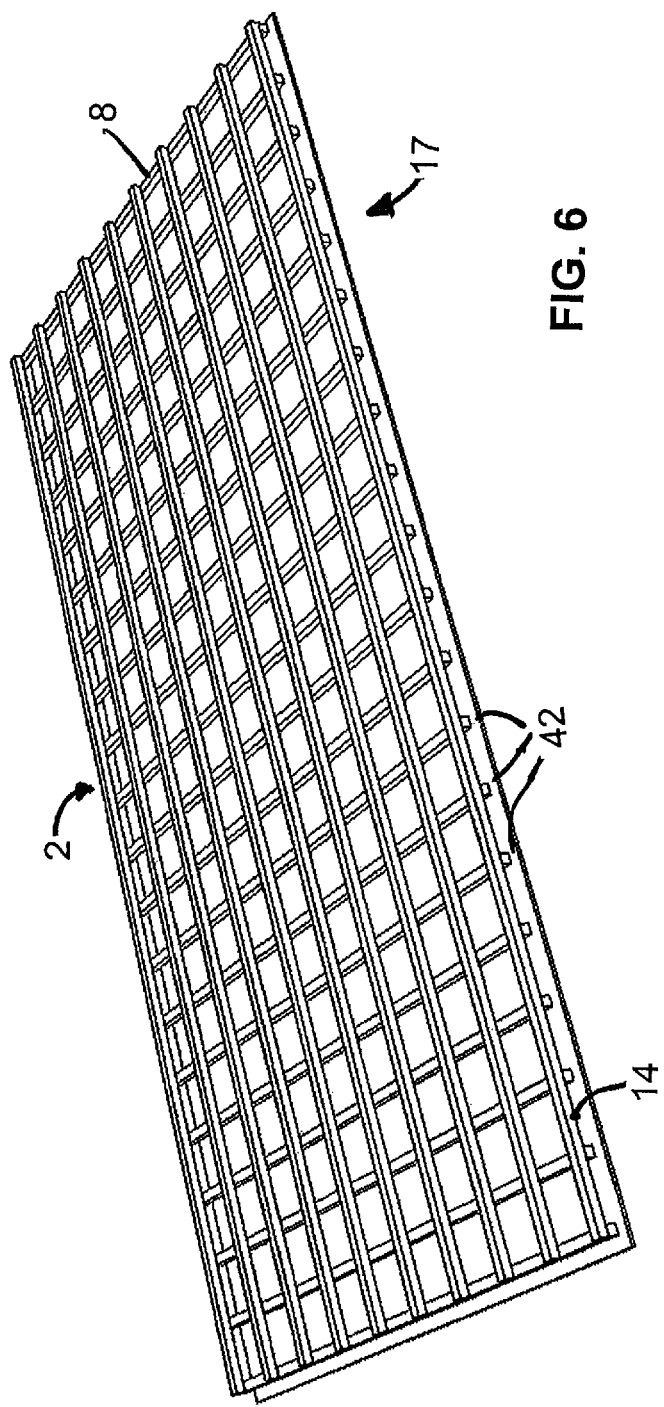
FIG. 6 is an iso view of an embodiment of the panel utilizing plywood veneer as spacing structural elements, without showing the top sheet.

Turning to FIG. 6, a plurality of plywood veneer strips 42 may also function as the elongated members 14. In such an embodiment, each elongated structural element 14 may be made up of a plurality of plywood veneer strips 42, ranging from two to ten 1/8 inch plywood veneer strips 42 per elongated structural element 14, and preferably six 1/8 inch plywood veneer strips 42 per elongated structural element 14.

Figure 7:
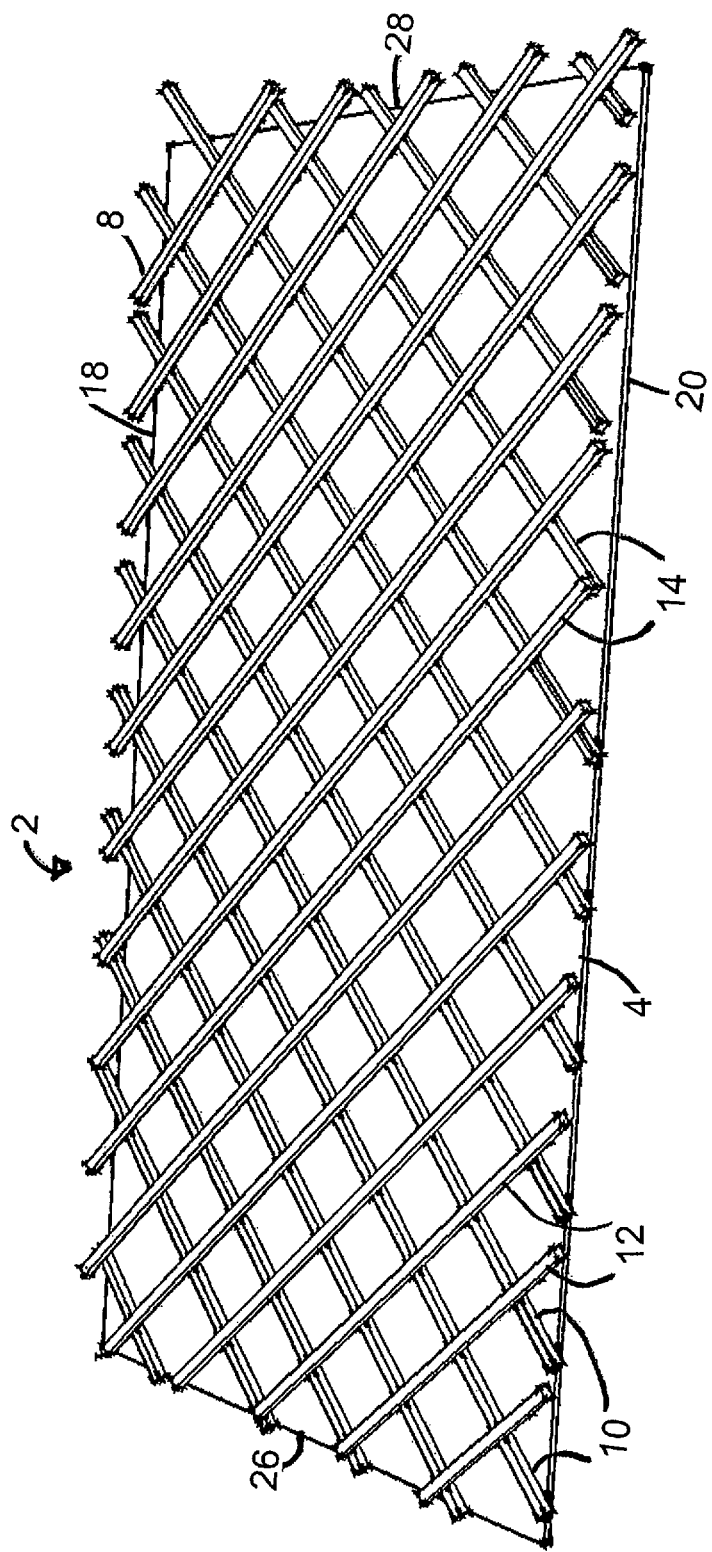
FIG. 7 is an iso view of an embodiment of the panel where the spacing structural elements are aligned diagonally, without showing the top sheet.

As shown in FIG. 7, the matrix 17 of elongated members 14 may be arranged diagonally with respect to the horizontal 18, 20, 22, 24 and vertical 26, 28, 30, 32 edges of the first and the second sheet 4, 6. In this embodiment, the elongated members 14 of the first layer 10 may be arranged at an angle of between 30° and 60° with respect to the first horizontal edge 18 of the first sheet 4, and preferably at an angle of 45° with respect to the first horizontal edge 18 of the first sheet 4. The elongated members 14 of the second layer 12 may also be arranged at an angle of between 30° and 60° with respect to the first horizontal edge 18 of the first sheet 4, and preferably at an angle of 45° with respect to the first horizontal edge 18 of the first sheet 4.

Figure 8:
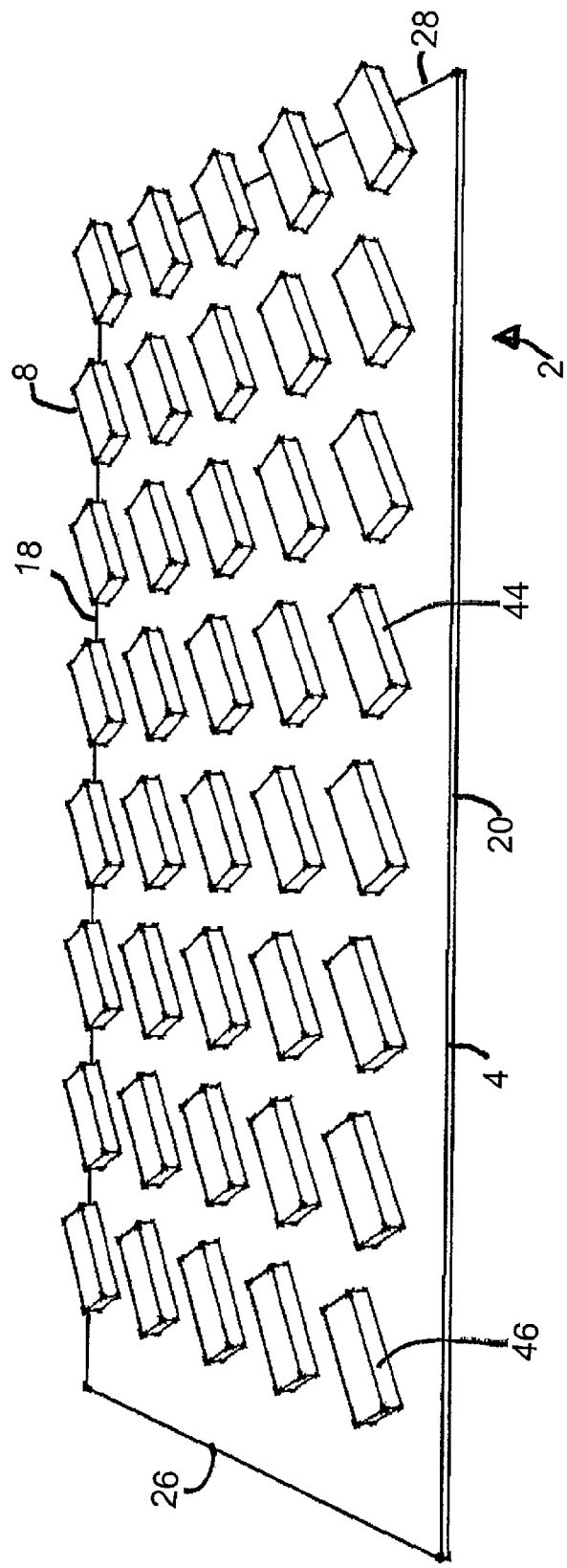
FIG. 8 is an iso view of an embodiment of the panel utilizing rectangular blocks as spacing structural elements, without showing the top sheet.
Figure 9:
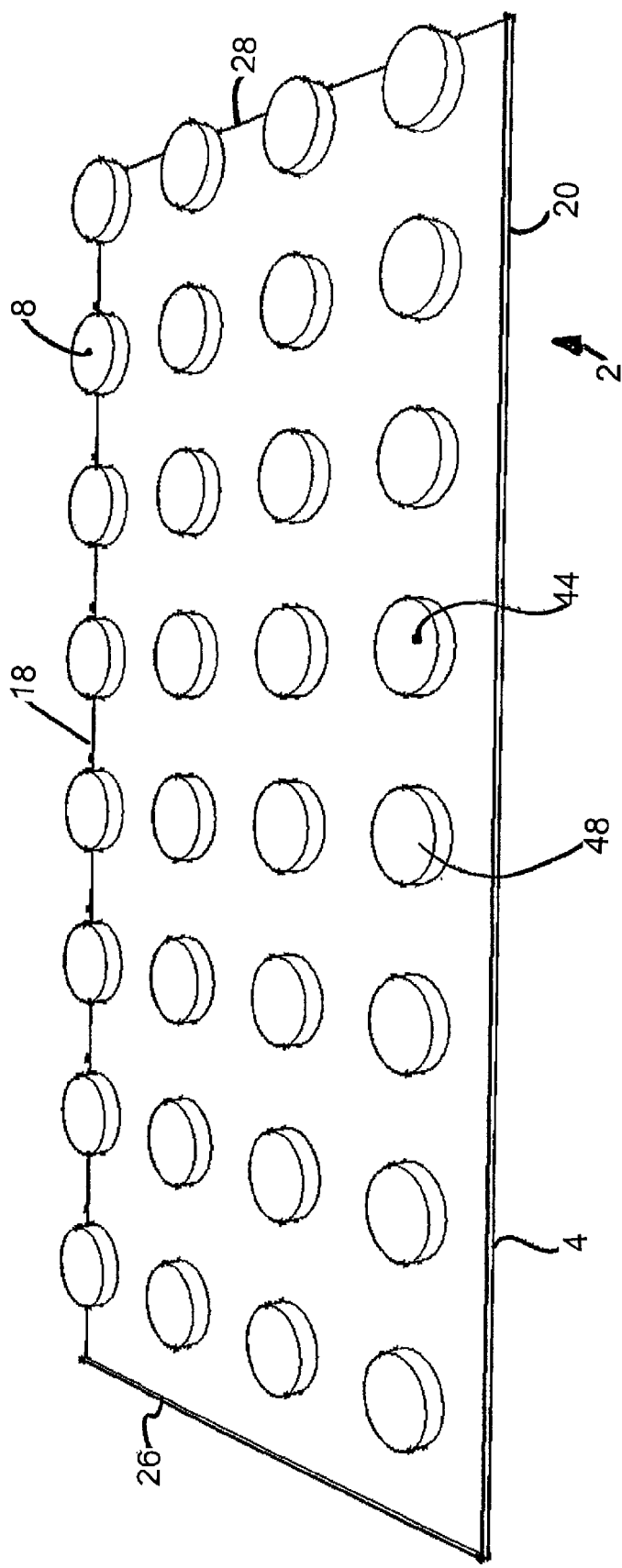
FIG. 9 is an iso view of an embodiment of the panel utilizing circular blocks as spacing structural elements, without showing the top sheet.
Figure 10:
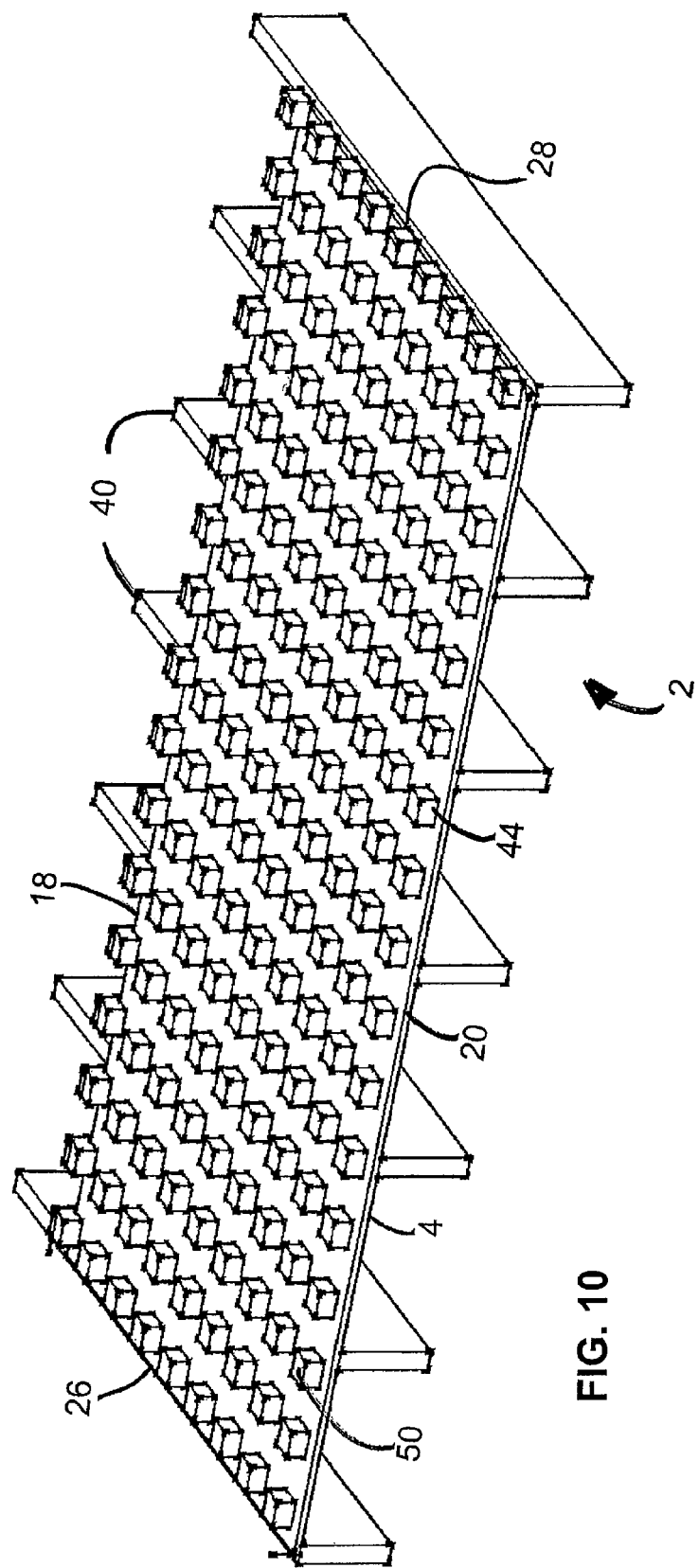
FIG. 10 is an iso view of an embodiment of the panel utilizing square blocks as spacing structural elements, without showing the top sheet.

As shown in FIGS. 8 through 10, the spacing structural elements 8 may also be comprised of blocks 44 being preferably rectangular 46, circular 48, or square 50 in shape. Though according to tests, panels 2 utilizing blocks 44 as the spacing structural elements 8 increased the strength of a comparable plywood board by only half as much as panels 2 utilizing elongated members 14 as the spacing structural elements 8, panels utilizing blocks 44 as the spacing structural elements 8 offer an increased assortment of paths that a pipe, tube, wire, or other insert 52 may be run through the panel 2, especially if the insert has dimensions approaching one half the spacing between the first and second sheet 4,6.

As shown in FIGS. 8 and 9 the blocks 44 would also preferably be indented a first and second distance 34, 36, and similarly have first and second protruding segments 35, 37, correspondingly overlapping their respective edges the same first and second distances 34, 36.

As shown in FIG. 8, the blocks 44 could also be aligned diagonally with respect to the horizontal 18, 20, 22, 24 and vertical 26, 28, 30, 32 edges of the first and the second sheet 4, 6. In this embodiment, the blocks 44 may be arranged at an angle of between 30° and 60° with respect to the first horizontal edge 18 of the first sheet 4, and preferably at an angle of 45° with respect to the first horizontal edge 18 of the first sheet 4.

Figure 11:
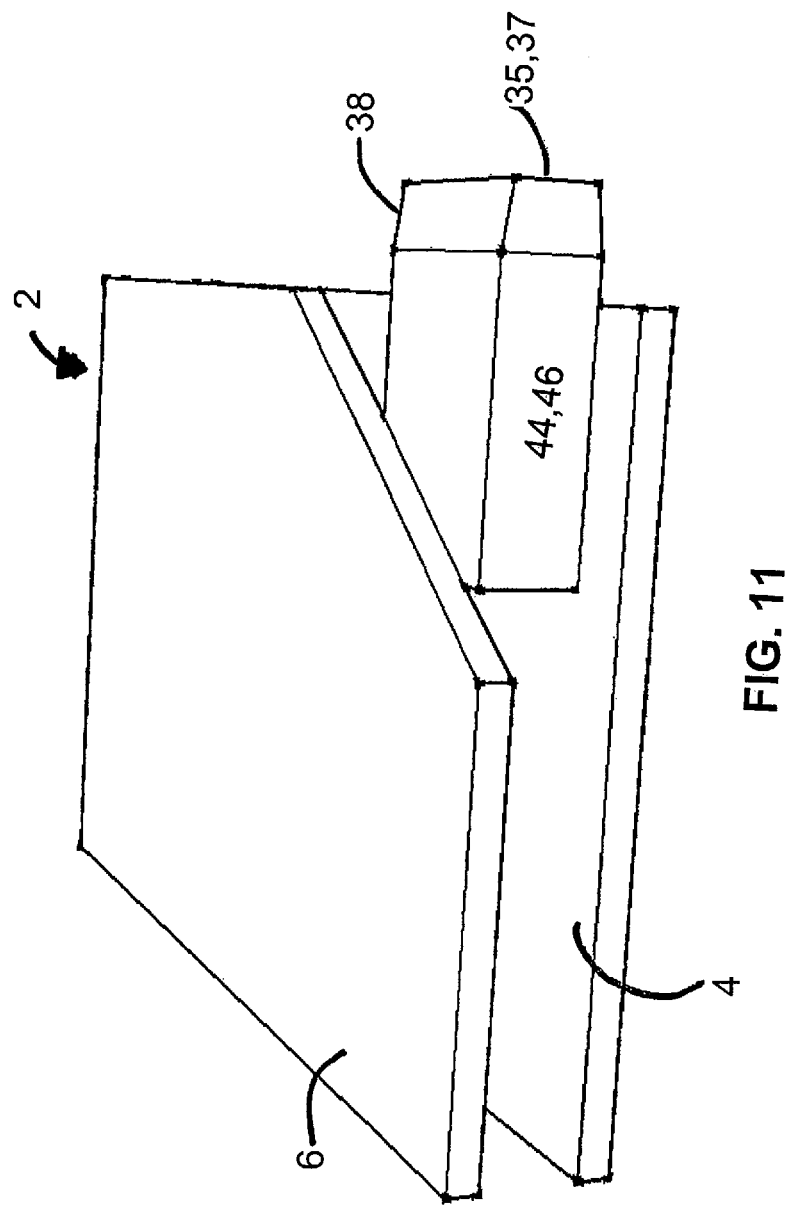
FIG. 11 is a close-up iso view of an embodiment of the panel, depicting the indented space, protruding segments, and chamfered edges.

As shown in FIG. 11, the protruding segments 35, 37 of the blocks 44 would similarly be provided with a chamfered edge 38, to assist in inserting the protruding segments 35, 37 of the blocks of a first panel 2 into the space provided by the blocks 44 of an adjacent second panel 2 indented at least as much as the distance the protruding segments 35, 37 protrude past the edge of the first and the second sheet 4, 6.

Figure 12:
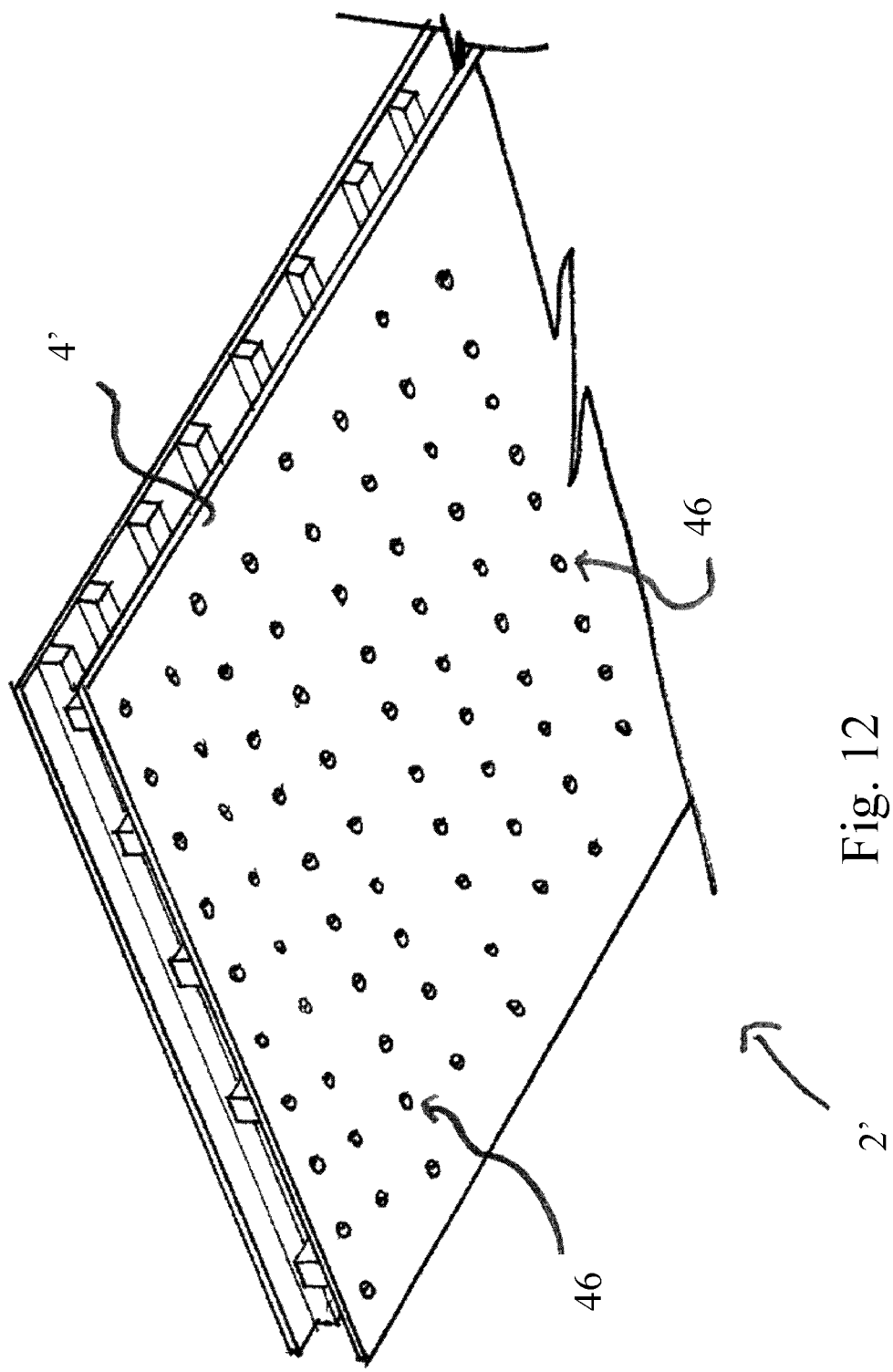
FIG. 12 is an iso view of an embodiment of the panel with perforations in one sheet, viewed from the underside.

Turning to FIG. 12, a perforated panel 2' with a perforated first sheet 4' is shown. The perforations 46 are arranged in a matrix type arrangement and facilitate the passage of air from the outside of the perforated panel 2', through the perforated first sheet 4', via the plurality of perforations 46 into the interior of the perforated panel 2'. The perforations 46 are through holes of between 1/16 inches and 1 1/2 inches in diameter, and preferably between 1/4 inches and 1 inch in diameter, and most preferably between 3/8 inches and 5/8 inches in diameter. The matrix arrangement may be staggered, with each hole spaced between 4 and 12 diameters from adjacent holes. Additionally, a layer of screening 80 (not shown) may be attached to the inner surface of the perforated first sheet 4'. The perforated panel 2' is constructed in a similar manner to the non-perforated panel 2, with the exception of perforating or using a perforated first sheet 4', and the perforated panel 2' may be used in the same manner as the non-perforated panel 2.

Figure 13A:
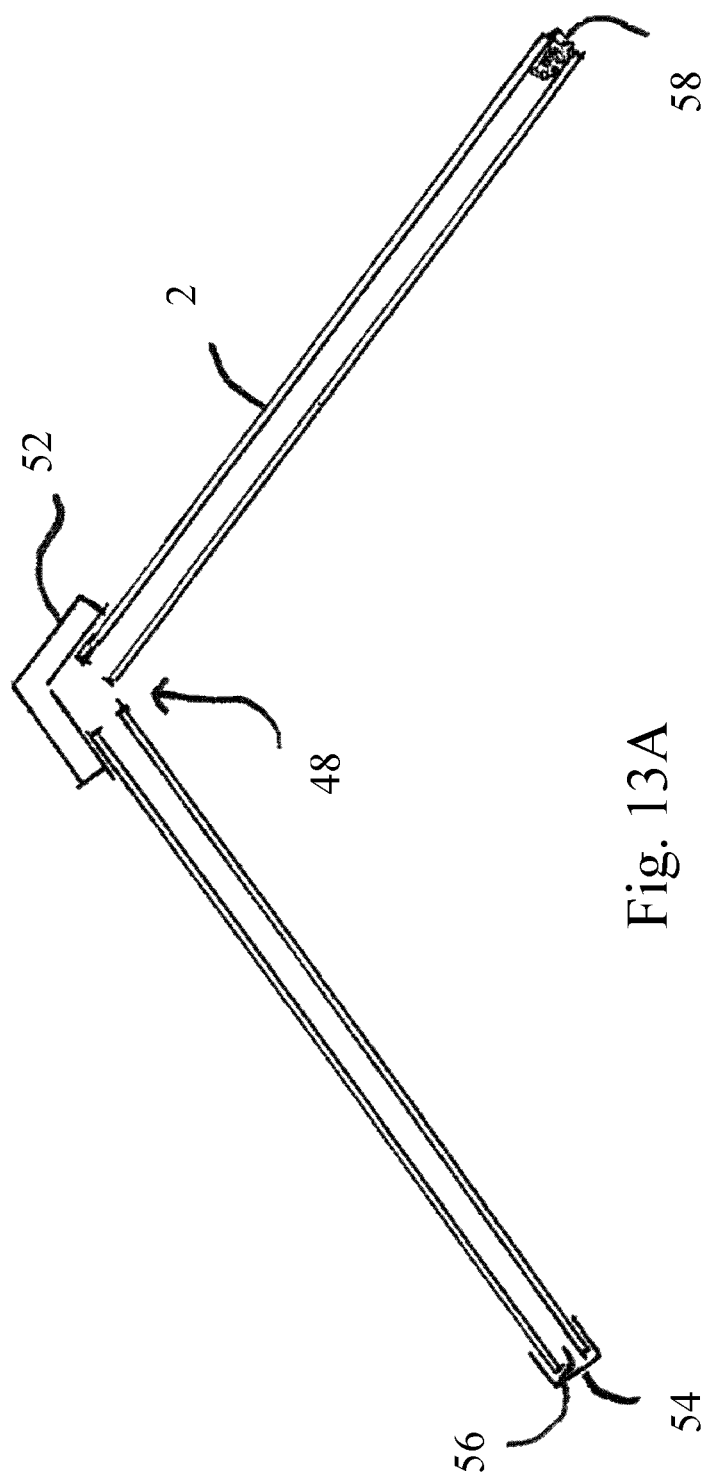
FIGS. 13A and 13B are side views of two roof arrangements constructed with the panels.
Figure 13B:
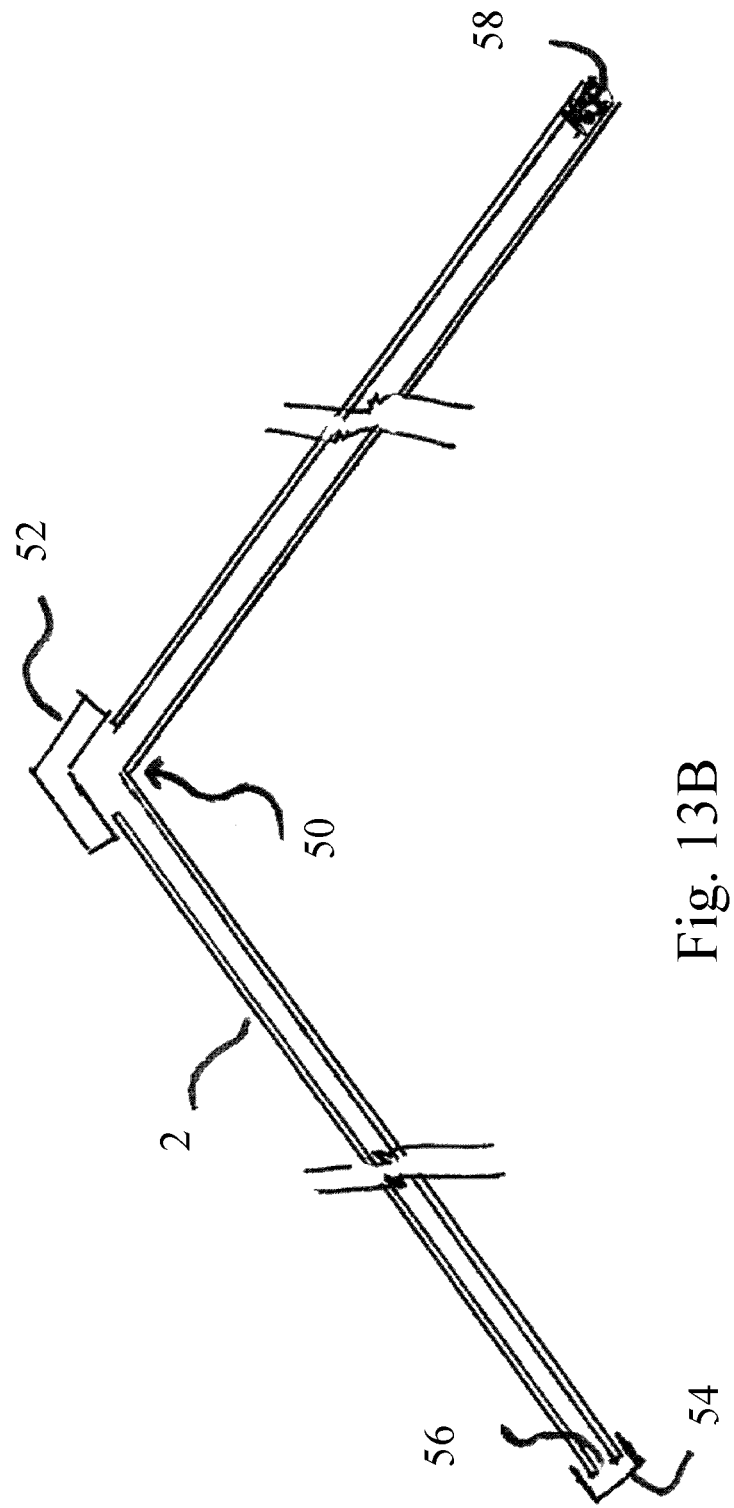

Turning to FIGS. 13A and 13B, two panel roofing arrangements are shown. FIG. 13A shows a panel arrangement suited for unfinished attics and non-living spaces. The panels 2, 2' are arranged so that neither the first nor the second sheets 4, 4', 6 of the panels 2, 2' opposite the ridge meet, leaving an interior ridge gap 48 and an exterior ridge gap. The ridge will be capped with a ridge vent 52. The bottommost terminal edges 56 of the panels 2, 2' will be include a screen 54, insect block 58, or other permeable occlusion, arranged to allow air passage into the interior of the panels 2, 2', but hinder insect entry.

FIG. 13B shows a panel arrangement suited for finished attics and living spaces. The panels 2, 2' are arranged so that the first sheets 4, 4' of the panels 2, 2' opposite the ridge meet, forming a solid interior ridge 50, but the second sheets 6 of the panels 2, 2' opposite the ridge meet do not meet, leaving an exterior ridge gap. The ridge will be capped with a ridge vent 52, and the bottommost terminal edges 56 of the panels 2, 2' will be likewise permeably occluded.

Figure 14:
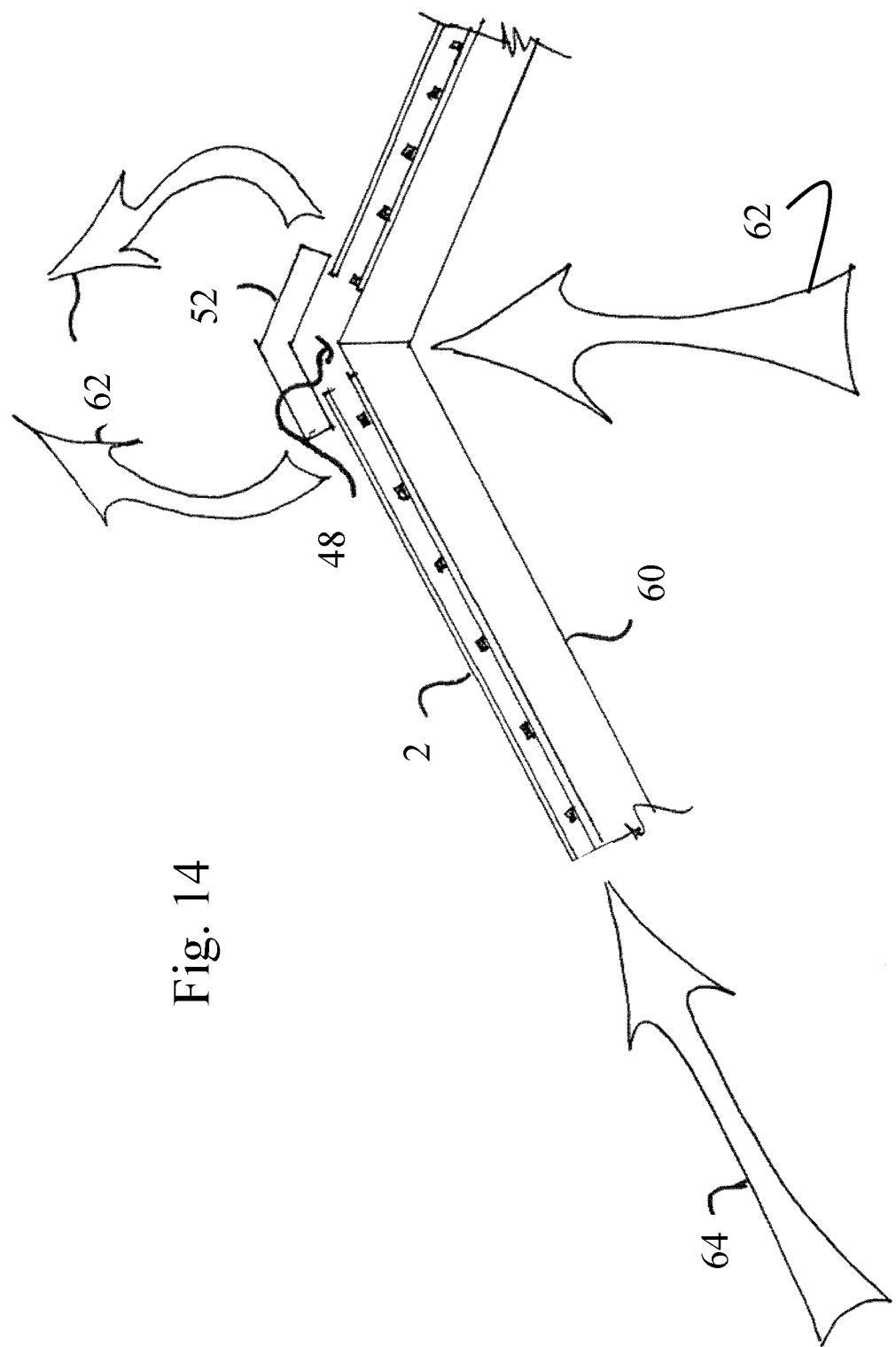
FIG. 14 is a sectional view of a roof arrangement constructed with the panels for an unoccupied attic.

As shown in FIG. 14, a panel arrangement for an unoccupied attic is demonstrated. Panels 2, 2' are arranged on trusses and rafters 60 so as to leave an interior ridge gap 48 and an exterior ridge gap, as described in FIG. 13A. The ridge is capped by a ridge vent 52. Warm, moist air 62 from the interior of the house is exhausted through the ridge vent, via the interior ridge gap 48 and exterior ridge gap. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and mixing with warm moist air entering through perforations 46, and exits through the ridge vent 52, via the exterior ridge gap.

Figure 15A:
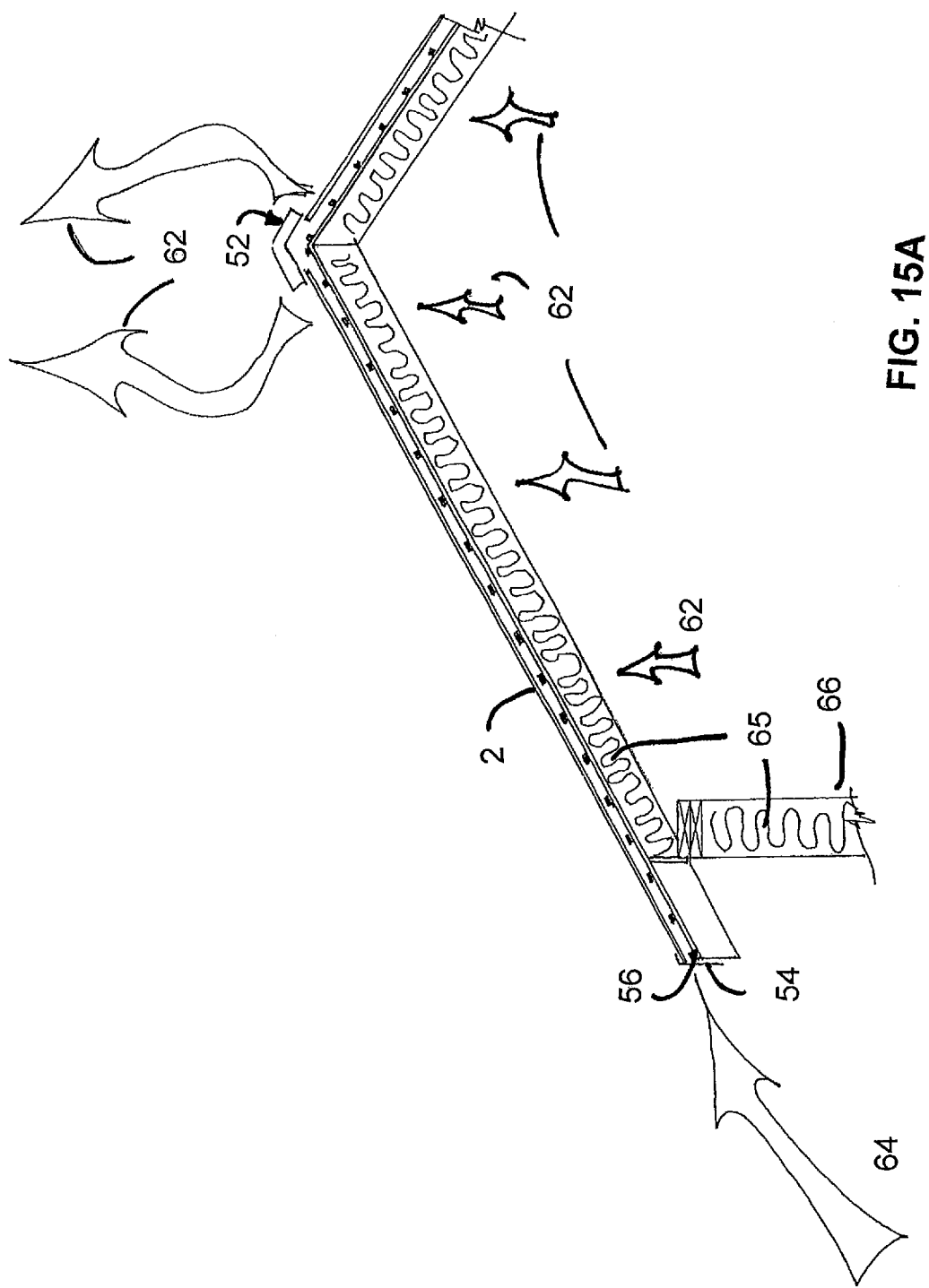
FIG. 15A is a sectional view of a roof arrangement constructed with the panels for an occupied attic.

As shown in FIG. 15A, a panel arrangement for an occupied attic or directly roofed living space is demonstrated. Panels 2, 2' are arranged on trusses and rafters 60 so as to leave an only an exterior ridge gap, as described in FIG. 13B. The ridge is capped by a ridge vent 52. Warm, moist air 62 progresses from the interior of the house through insulation 65 and transfers its heat and moisture to the insulation 65 and first sheets 4, 4' of the panels 2, 2'. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and exits warm air 62 through the ridge vent 52, via the exterior ridge gap. The upper terminal edges 56 forming the upper ridge gaps in each embodiment may also be permeably occluded 54, 58.

Figure 15B:
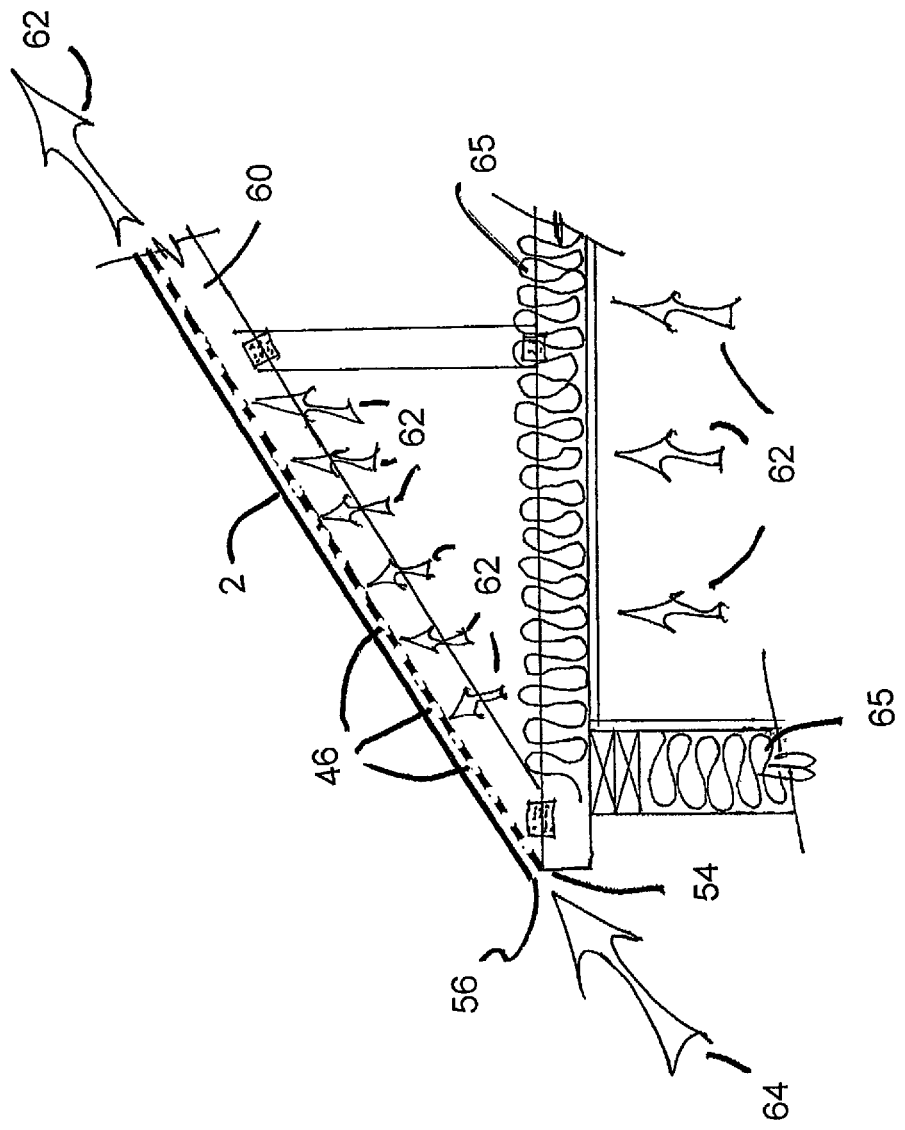
FIG. 15B is a sectional view of a roof arrangement constructed with the panels for an unoccupied attic space, where some of the panels are perforated.

As shown in FIG. 15B a panel arrangement for an unoccupied attic space, using perforated panels is demonstrated. The perforated panels 2' are arranged such that the perforated first sheet faces the interior of the building, allowing warm air 62 to directly enter into the interior of the panel matrix through the perforations 46, from multiple locations in the attic space. Because of the increased ventilation due to the perforations 46 in the perforated panels 2', the panels may be arranged either with or without an interior ridge gap 48. It is envisioned that a ridge vent 52 will be used to cap an exterior ridge gap (not shown) to allow the exhaust of warm air 64 out of the panel matrix, and in combination may be used with one or more gabled vents (not shown).

Figure 17:
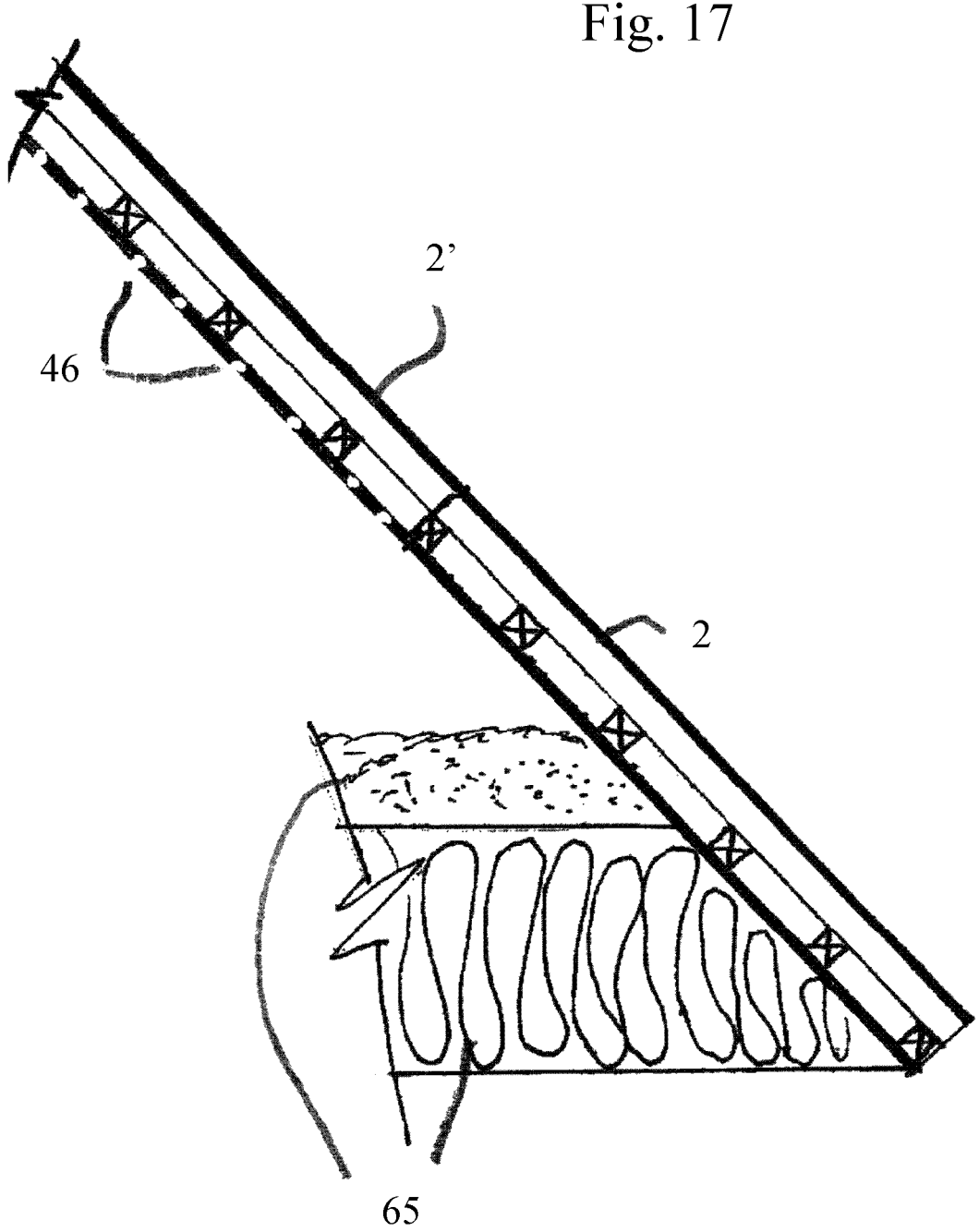
FIG. 17 is a sectional view of a portion of a roof arrangement constructed using perforated and non-perforated panels.

As shown in FIGS. 16 and 17, the perforated panels 2' and non-perforated panels 2 may be used in conjunction in a roofing construction arrangement. In one embodiment, the perforated panels 2' are arranged in the top one or more rows of the roof sheathing and the non-perforated panels 2 are arranged in the bottom one or more rows of roof sheathing. The inner first sheets 4' of the upper rows of panels 2' normally lack abutting insulation 65, allowing warm moist air to more freely enter perforations 46. The inner first sheets 4 of the lower rows of panels 2 normally have abutting insulation 65, diminishing air transfer rates through perforations 46, and therefore would normally have non-perforated first sheets 4. It is to be appreciated that sheeting arrangements of all perforated panels 2', all non-perforated panels 2, or any combination of perforated and non-perforated panels 2' 2, would still fall in the scope of this invention.

Figure 18:
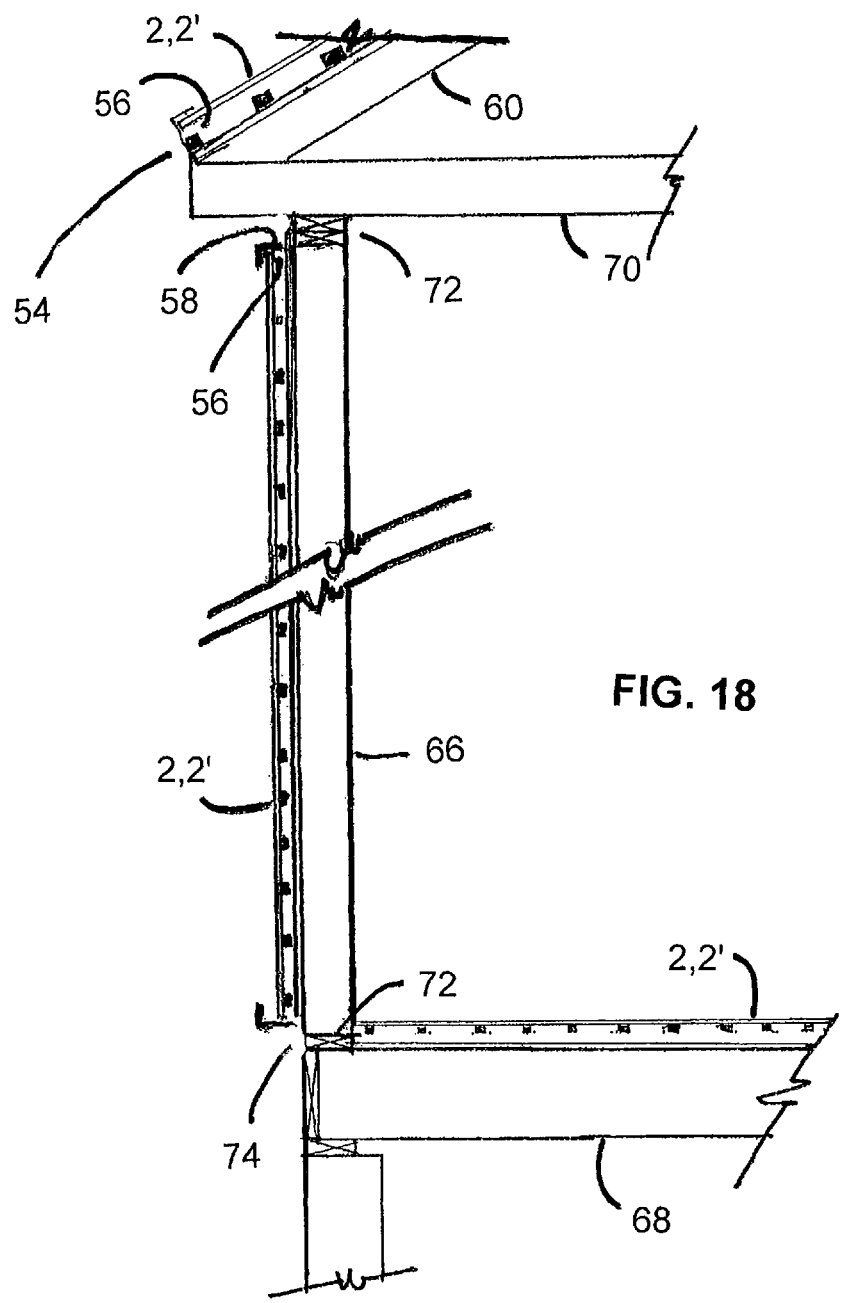
FIG. 18 is a sectional view of a house showing a wall, floor, and roof constructed using the panels.
Figure 19:
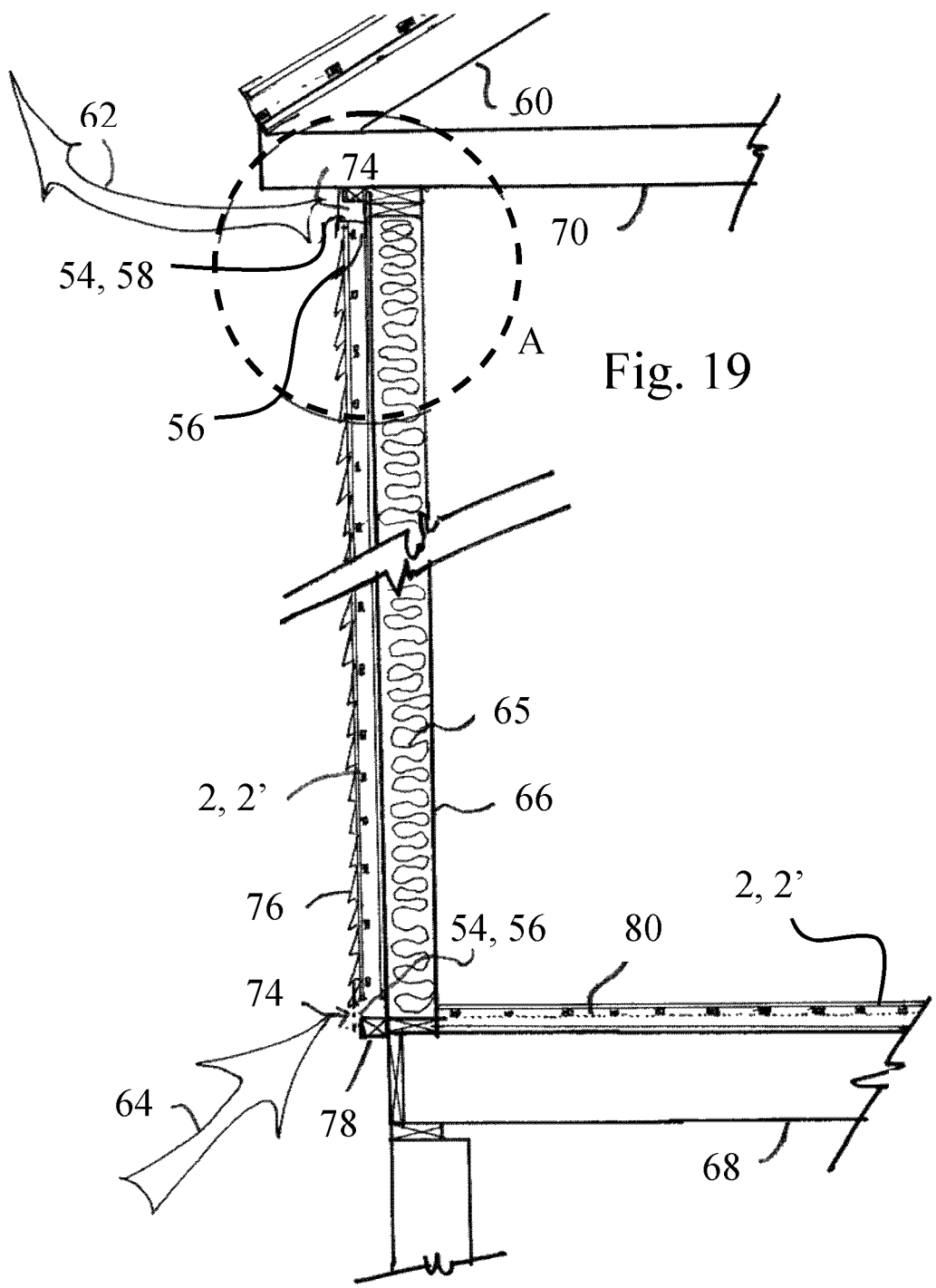
FIG. 19 is a sectional view of an insulated house showing a wall, floor, and roof constructed using the panels.

Turning now to FIGS. 18 and 19, the panels may be likewise used in wall sheathing and flooring. As shown in FIG. 18, a panel 2, 2' may be attached to a wall joist/wall stud 66 and floor joist 68, in a similar manner as traditional sheeting materials. As with roofing embodiments, the terminal edges 56 will include permeable occlusions 54, 58. In one embodiment, a terminal gap 74, facilitated by joist spacing elements 72, here proximate to the ceiling joists 70, provides a passageway for air to inter and exit the interior of the panels 2, 2'.

Figure 20:
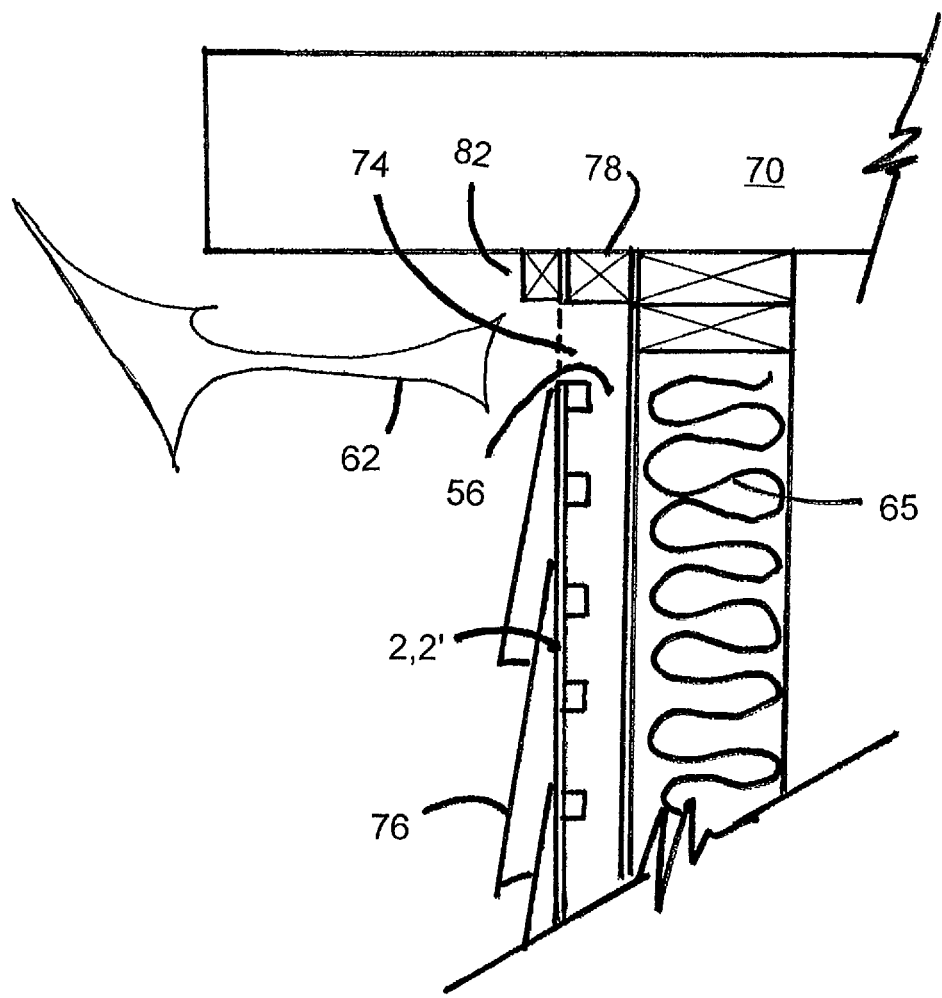
FIG. 20 is an exploded view of the portion indicated as portion A in FIG. 19.

In the embodiment shown in FIG. 19, a panel 2, 2' is attached to an insulated 65 wall joist/wall stud and a floor joist 68, with siding 76 attached to the exterior sheet of the panels 2, 2'. The flooring panel 2, 2' contains a layer of screening 80 between the first layer 10 and the second layer 12 of elongated members 14. Cool air 64 enters the panel 2, 2' interior by passing through a lower terminal gap 74, facilitated by joist spacing elements 72, then through the permeably occluded 54, 58 lower terminal edge 56, moves up through the interior of the panel 2, 2' absorbing heat and moisture from the first and the second sheets 4, 4', 6, and exits warm air 62 through the permeably occluded 54, 58 upper terminal edge 56, and out an upper terminal gap 74. The air flow may be channeled by one or more first channeling component 78, and as shown in FIG. 20, one or more second channeling components 82. The first and the second channeling components may be decorative as well as functional, and serve additionally as housing trim.

FIG. 20 shows a close up of the upper section of FIG. 19, indicated as portion A, showing in detail the upper terminal gap, and the first and the second channeling components 78, 82.

Wherefore, I claim:

1. A ventilated structural panel comprising:
   a first sheet, defining a first plane, having edges that define a horizontal axis with a first horizontal edge and a second horizontal edge, and vertical axis with a first vertical edge and a second vertical edge;
   a second sheet, defining a second plane, and having substantially a same horizontal and vertical dimensions as the first sheet and having edges that define a horizontal axis and vertical axis, with a first horizontal edge and a second horizontal edge and a first vertical edge and a second vertical edge;
   the first and the second plane being parallel;
   a first layer of a plurality of spacing structural elements, fixedly attached to the first sheet;
   a second layer of the plurality of spacing structural elements, fixedly attached to both the second sheet and the first layer of the plurality of spacing structural elements, and spaced from the first sheet by the first layer of the plurality of spacing structural elements;
   the plurality of spacing structural elements are arranged in a matrix comprised of elongated members forming the first layer and the second layer, and each elongated member in each layer is coplanar, parallel, and equidistance from each neighboring elongated member in a same layer,
   the first and the second layer of elongated members defining two spaced parallel planes, and each elongated member of the first layer being perpendicular in orientation to each elongated member of the second layer,
   the elongated members of at least one of the first layer and the second layer are arranged perpendicular to at least one of the horizontal axis and the vertical axis of the first and second sheets;
   the plurality of spacing structural elements, fixedly attaching the first sheet to the second sheet, such that a bending strength of the panel is greater than combined individual bending strengths of the first and the second sheet; and
   spacing between adjacent spacing structural elements in the same layer defining a plurality of unobstructed pathways from at least one edge of the panel to at least one of an opposite and an adjacent edge of the panel,
   the spacing structural elements being arranged to provide integral ventilation through the panel and between the first and the second sheet, and
   a distance of between 3 and 18 times a width of each spacing structural element separates each spacing structural element from each neighboring spacing structural element of the same layer.

2. The ventilated structural panel in claim 1, further comprising:
   at least one layer of elongated members overlapping the first horizontal edge of the first sheet by a first distance;
   at least one layer of elongated members overlapping the first vertical edge of the first sheet by a second distance;
   at least one layer of elongated members being indented from the second horizontal edge of the first sheet by at least the first distance;
   at least one layer of elongated members being indented from the second vertical edge of the first sheet by at least the second distance;
   a portion of each elongated member that protrudes over an edge of the first sheet being chamfered to assist in matingly fitting a first ventilated structural panel to an adjacent ventilated structural panel along any edge of the first ventilated structural panel; and
   the elongated members being comprised of one of wood, wood composite, plastic, a combination of wood and plastic, and a combination of wood composite and plastic.

3. The ventilated structural panel in claim 1, wherein the first and the second sheet are made of one of plywood and Oriented Strand Board.

4. The ventilated structural panel in claim 1 wherein the first and the second sheets are each between 0.125 inches and 1.0 inches in thickness, and between 3.5 and 4.5 feet by between 7.5 and 8.5 feet in planar dimensions.

5. The ventilated structural panel in claim 1 wherein the spacing structural elements are comprised of spacer blocks in the shape of one of a square, a circle, an oval, and a rectangle.

6. The ventilated structural panel in claim 1, wherein each layer of spacing structural elements is adjacent to one of the first or the second sheet.

7. The ventilated structural panel in claim 1, wherein the ventilated structural panel only has two layers of structural spacing elements.

8. The ventilated structural panel in claim 1, where the spacing structural elements have a cross sectional width which is substantially equal to a cross sectional height.

9. The ventilated structural panel in claim 1, wherein the spacing structural elements have a substantially square transverse cross sectional shape.

10. The ventilated structural panel in claim 1, wherein each one of the spacing structural elements of the first layer, is affixed to the first sheet by a panel engaging surface and has an opposed structural element engaging surface, and a portion of the structural element engaging surface which engages with the spacing structural elements of the second layer is less than 50 percent of a total surface area of the structural element engaging surface.

11. The ventilated structural panel in claim 1, wherein a total thickness of the ventilated structural panel is between 0.75 inches and 4.5 inches.

12. The ventilated structural panel in claim 1, wherein the spacing structural elements are comprised of rectangular shaped elongated members arranged in the matrix.

13. The ventilated structural panel in claim 12, wherein the elongated members are comprised of plywood veneer strips.

14. The ventilated structural panel in claim 12, wherein each elongated member is sized such that a largest dimension of each elongated member is equal to a linear distance of between 95% and 105% the distance from either the first horizontal edge or first vertical edge of the first sheet to either the second horizontal edge or second vertical edge of the first sheet, such distance measured along a line corresponding to the orientation of each elongated member.

15. The ventilated structural panel in claim 14, wherein a surface of the first sheet has a plurality of through holes, the holes measuring between 0.0625 inches and 1.5 inches in diameter.

16. The ventilated structural panel in claim 14, wherein a distance of between 5 and 16 times the width of each elongated member separates each elongated member from each neighboring elongated member of the same layer.

17. The ventilated structural panel in claim 14, wherein each elongated member measures between 0.25 inches and 1.25 inches in height and between 0.25 inches and 1.25 inches in width.

18. The ventilated structural panel in claim 17, wherein each elongated member measures between 0.70 and 0.80 inches in height and between 0.70 and 0.80 inches in width.

19. A ventilated structural panel comprising:
a first sheet, defining a first plane, having edges that define a horizontal axis with a first horizontal edge and a second horizontal edge, and vertical axis with a first vertical edge and a second vertical edge;
a second sheet, defining a second plane, and having substantially a same horizontal and vertical dimensions as the first sheet and having edges that define a horizontal axis and vertical axis, with a first horizontal edge and a second horizontal edge and a first vertical edge and a second vertical edge;
the first and the second plane being parallel;
a first layer of a plurality of spacing structural elements, fixedly attached to the first sheet;
a second layer of the plurality of spacing structural elements, fixedly attached to both the second sheet and the first layer of the plurality of spacing structural elements, and spaced from the first sheet by the first layer of the plurality of spacing structural elements;
the plurality of spacing structural elements are arranged in a matrix comprised of elongated members forming the first layer and the second layer, and each elongated member in each layer is coplanar, parallel, and equidistance from each neighboring elongated member in a same layer,
the first and the second layer of elongated members defining two spaced parallel planes, and each elongated member of the first layer being perpendicular in orientation to each elongated member of the second layer,
the elongated members of at least one of the first layer and the second layer are arranged at an angle of between 30 degrees and 60 degrees to at least one of the horizontal axis and the vertical axis of the first and second sheets;
the plurality of spacing structural elements, fixedly attaching the first sheet to the second sheet, such that a bending strength of the panel is greater than combined individual bending strengths of the first and the second sheet; and
spacing between adjacent spacing structural elements in the same layer defining a plurality of unobstructed pathways from at least one edge of the panel to at least one of an opposite and an adjacent edge of the panel,
the spacing structural elements being arranged to provide integral ventilation through the panel and between the first and the second sheet, and
a distance of between 3 and 18 times a width of each spacing structural element separates each spacing structural element from each neighboring spacing structural element of the same layer.

* * * * *